United States Patent
Watanabe et al.

(10) Patent No.: US 7,593,122 B2
(45) Date of Patent: Sep. 22, 2009

(54) IMAGE INPUTTING APPARATUS, IMAGE OUTPUTTING APPARATUS, AND COMPOSITE SYSTEM THAT INCLUDES IMAGE INPUTTING APPARATUS AND IMAGE OUTPUTTING APPARATUS

(75) Inventors: Yuichi Watanabe, Tokyo (JP); Kenichi Machiyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 912 days.

(21) Appl. No.: 11/165,262

(22) Filed: Jun. 23, 2005

(65) Prior Publication Data
US 2006/0001900 A1  Jan. 5, 2006

(30) Foreign Application Priority Data
Jun. 30, 2004 (JP) ............................. 2004-192959
Mar. 9, 2005 (JP) ............................. 2005-065035

(51) Int. Cl.
G06F 15/00 (2006.01)
(52) U.S. Cl. ...................... 358/1.14; 358/1.15; 358/1.18
(58) Field of Classification Search ................ 358/1.18, 358/1.14, 1.13, 1.16, 403
See application file for complete search history.

(56) References Cited
U.S. PATENT DOCUMENTS

2002/0015175 A1* 2/2002 Katsuda ..................... 358/1.15
2002/0030743 A1* 3/2002 Inui ............................ 348/195
2004/0156068 A1* 8/2004 Yoshida et al. ............. 358/1.13
2005/0210259 A1* 9/2005 Richardson ................. 713/179

FOREIGN PATENT DOCUMENTS
JP       2002-152446 A     5/2002

* cited by examiner

Primary Examiner—King Y Poon
Assistant Examiner—Allen H Nguyen
(74) Attorney, Agent, or Firm—Panitch Schwarze Belisario & Nadel LLP

(57) ABSTRACT

A composite system includes an image-inputting apparatus and an image-outputting apparatus. The image-inputting apparatus includes a receiving section and first decision section. The receiving section receives an identification. The first decision section compares the identification with identifications that have been registered previously in the image-inputting apparatus, thereby determining whether the identification should be permitted to use the image-inputting apparatus. The identification is transmitted to the image outputting apparatus. The image outputting apparatus includes a second decision section. The second decision section compares the identification with identifications that have been registered previously in the image outputting apparatus, thereby determining whether the identification should be permitted to use the image-outputting apparatus. A replay indicative of the second determination is transmitted to the image-inputting apparatus. The image is outputted to the image-outputting apparatus in accordance with the determination made by said first decision section and the reply.

14 Claims, 29 Drawing Sheets

FIG.20
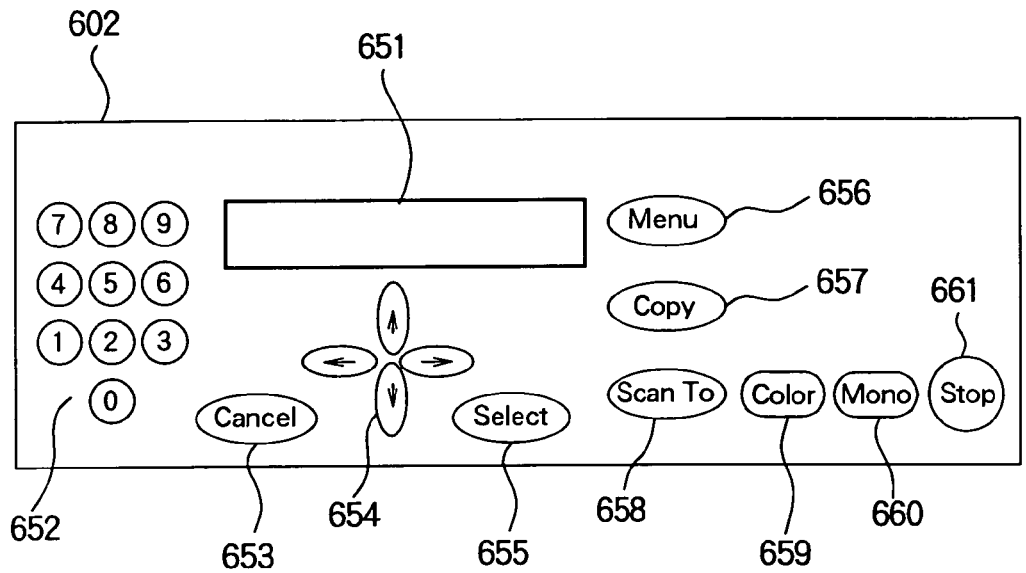
FIG.21
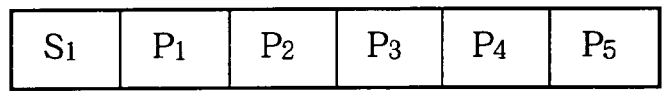
$S_1$ : SCANNER RESTRICTION ID
$S_1$, $P_1$, $P_2$, $P_3$, $P_4$, $P_5$ : PRINTER RESTRICTION ID
FIG.22
| FUNCTION RESTRICTION ID (6byte) | PRINTING FUNCTION (3byte) | COLOR PRINTING FUNCTION (3byte) | |
|---|---|---|---|
| 123456 | OFF | OFF | COPY NOT PERMITTED |
| 789012 | OFF | ON | COPY NOT PERMITTED |
| 024680 | ON | OFF | COLOR COPY NOT PERMITTED |
| 135791 | ON | ON | COLOR COPY PERMITTED |

FIG. 24A

FUNCTION RESTRICTION
ID INPUTTING SCREEN

| Input PIN ID |
|---|

FIG. 24B

USAGE OF PRINTER IS
NOT PERMITTED

| Copy is Unusable |
|---|

FIG. 24C

USAGE OF COLOR PRINTING
IS NOT PERMITTED

| Color Copy is Unusable |
|---|

FIG. 24D

INPUTTED ID IS NOT
COINCIDENT WITH
REGISTERED ID

| PIN ID Error |
|---|

FIG. 24E

USAGE OF "SCAN-TO" IS
NOT PERMITTED

| Scan to is Unusable |
|---|

FIG. 24F

USAGE OF "COLOR SCAN-TO"
IS NOT PERMITTED

| Color Scanning is Unusable |
|---|

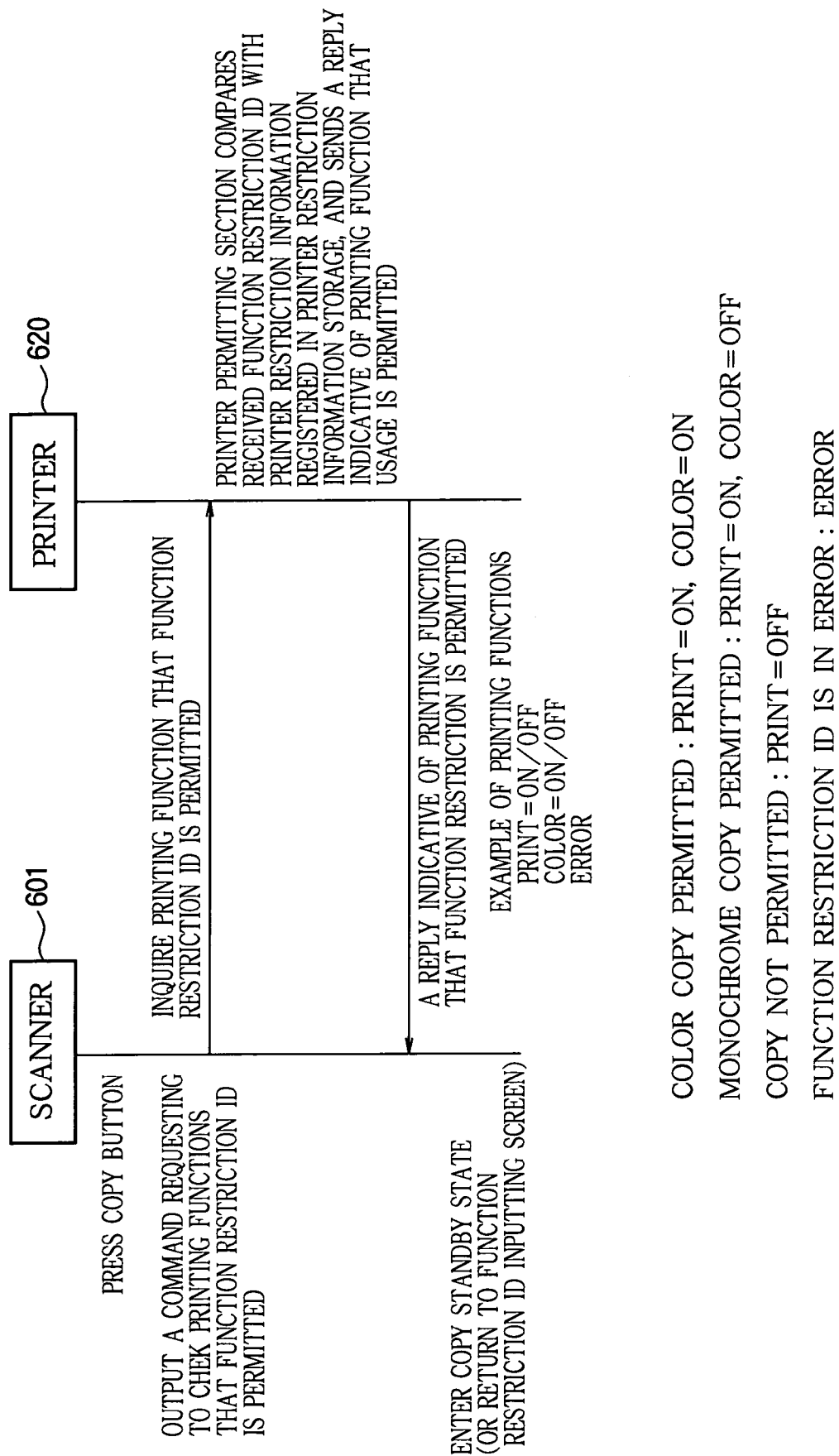

FIG. 26A PRESS MENU BUTTON

> >Network Menu
> Management Menu

FIG. 26B MOVE CURSOR TO MANAGEMENT MENU AND PRESS SELECT

> Network Menu
> >Management Menu

FIG. 26C INPUT ADMINISTRATOR'S PASSWORD AND THEN PRESS SELECT BUTTON

> Password
>
> \*\*\*\*\*\*\*\*\*

FIG. 26D MOVE CURSOR TO "SCAN-TO RESTRICTION" AND THEN PRESS SELECT BUTTON

> >Scan to Restriction : OFF
> PIN Setting : Disable

FIG. 26E SELECT A DESIRED NUMERAL AND THEN PRESS SELECT BUTTON

> Scan to Restriction :
> OFF/0/1/2/3/4/5/6/7/8/9

FIG. 26F MOVE CURSOR TO "PIN SETTING" AND THEN PRESS SELECT BUTTON

> Scan to Restriction : 0
> >PIN Setting : Disable

FIG. 26G SELECT "ENABLE" AND THEN PRESS SELECT BUTTON

> PIN Setting
> Disable/Enable

S1, S2 : SCANNER RESTRICTION ID
S1, S2, P1, P2, P3, P4, : PRINTER RESTRICTION ID

| S1<br>READING FUNCTION<br>PERMIT INFORMATION<br>(1byte) | S2<br>COLOR READING<br>FUNCTION INFORMATION<br>(1byte) | |
|---|---|---|
| 1 | 5 | COLOR READING PERMITTED |
| 1 | 6 | COLOR READING NOT PERMITTED |
| 3 | 7 | READING NOT PERMITTED |

FIG. 33A  PRESS MENU BUTTON

>Network Menu
 Management Menu

FIG. 33B  MOVE CURSOR TO MANAGEMENT MENU AND PRESS SELECT BUTTON

Network Menu
>Management Menu

FIG. 33C  INPUT ADMINISTRATOR'S PASSWORD AND THEN PRESS SELECT BUTTON

Password
*********

FIG. 33D  MOVE CURSOR TO "SCAN TO RESTRICTION" AND THEN PRESS

>Scan to Restriction : OFF
 Color Scan Restriction : OFF

FIG. 33E  SELECT A DESIRED NUMERAL AND THEN PRESS SELECT BUTTON

Scan to Restriction :
OFF/0/12/3/4/5/6/7/8/9

FIG. 33F  MOVE CURSOR TO COLOR SCAN-RESTRICTION AND THEN PRESS SELECT BUTTON

Scan to Restriction : 1
>Color Scan Restriction : OFF

FIG. 33G  SELECT A DESIRED NUMERAL AND THEN PRESS SELECT BUTTON

Color Scan Restriction :
OFF/0/12/3/4/5/6/7/8/9

IMAGE INPUTTING APPARATUS, IMAGE OUTPUTTING APPARATUS, AND COMPOSITE SYSTEM THAT INCLUDES IMAGE INPUTTING APPARATUS AND IMAGE OUTPUTTING APPARATUS

BACKGROUND OF THE INVENTION

1. Field of the Invention

The present invention relates to a composite system that includes an image inputting apparatus such as a scanner that captures an image and an image outputting apparatus that outputs an image captured into the image inputting apparatus. In particular, the present invention relates to restriction on the usage of the image inputting apparatus and image outputting apparatus.

2. Description of the Related Art

A conventional multifunction apparatus includes an image reading section and a printing section, which cooperate to primarily perform the functions of a copying machine, a scanner, a printer, and a facsimile machine. One such multifunction apparatus stores menus for individual users and displays a specific display screen to a corresponding user, thereby restricting the usage of the multifunction apparatus.

For example, a multifunction composite system can be configured by coupling an image inputting apparatus such as a scanner to an image outputting apparatus such as a printer over a network I/F or a local I/F cable. When a printer performs printing, it consumes toner and paper. Thus, usage of the printer needs to be restricted because the consumed amount of such consumable items should be managed. In contrast, a scanner may sometimes be operated alone. Therefore, usage of a scanner also needs to be restricted. Restriction of usage of the respective apparatuses separately is complicated.

SUMMARY OF THE INVENTION

The present invention was made to overcome problems of the aforementioned conventional art.

An object of the invention is to simplify the procedure for restricting the usage of the structural elements of a multifunction composite system.

A composite system includes an image-inputting apparatus into which an image is inputted, and an image-outputting apparatus that receives the image from the image-inputting apparatus and outputs the received image. The image-inputting apparatus includes an information receiving section, a first decision section, and a first transmitter. The information receiving section receives a first item of information. The first decision section makes a first determination as to whether the first item of information should be permitted to use the image-inputting apparatus. The first determination is made based on the first item of information (e.g., ID) inputted into the image-inputting apparatus and a second item of information (e.g., IDs) that has been registered previously in the image-inputting apparatus. The first transmitter transmits the first item of information to the image-outputting apparatus.

The image-outputting apparatus includes a second decision section and a second transmitter. The second decision section makes a second determination as to whether the first item of information should be permitted to use the image-outputting apparatus. The second determination being made based on the first item of information (e.g., ID) and a third item of information (e.g., IDs) that has been registered previously in the image-outputting apparatus. The second transmitter transmits a reply indicative of the second determination to the image-inputting apparatus. The image-inputting apparatus outputs the image to the image-outputting apparatus in accordance with the first determination made by the first decision section and the reply.

The first decision section makes the first determination by checking a part of the first item of information against a corresponding part of the second item of information.

The image-inputting apparatus further includes an operation mode storing section that holds a selected operation mode. The first decision section makes the first determination and the second decision section makes the second determination after the operation mode storing section holds the selected operation mode. The image-inputting apparatus outputs the image to the image-outputting apparatus in accordance with the first determination, the reply, and the selected operation.

The image-inputting apparatus further includes a determination storing section that holds information on whether the first decision section has made the first determination and the second decision section has made the second determination. Only when the information held in the determination storing section indicates that the first decision section has not made the first determination and the second decision section has not made the second determination, the image-inputting apparatus prompts inputting of the first item of information for the first and second decision sections to make the first and second determinations, respectively. The determination storing section holds information indicative that the first decision section has made the first determination and the second decision section has made the second determination, in response to the first determination and the reply. The determination storing section is cleared prior to selection of another operation mode.

The image-inputting apparatus further includes a usage restriction section that holds information that describes whether usage of the image-inputting apparatus and the image-outputting apparatus should be restricted. Only when the information held in the usage restriction section indicates that usage of the image-inputting apparatus should be restricted, the image-inputting apparatus prompts inputting of the first item of information for the first and second decision sections to make the first determination and second determination and the image-inputting apparatus outputs the image to the image-outputting apparatus in accordance with the first determination and the second determination.

The image-outputting apparatus includes an amount-of-usage storing section that holds a fourth item of information on an amount of usage of the image-outputting apparatus in which the first item of information is permitted to use the image-outputting apparatus.

The second item of information corresponds to functions of the image-inputting apparatus and indicates that the first item of information is permitted to use the image-inputting apparatus. The third item of information corresponds to functions of the image-outputting apparatus and indicates that the first item of information is permitted to use the image-outputting apparatus.

A first part of the second item of information and a first part of the third item of information correspond to a permission of usage of a first function of the image-inputting apparatus. A second part of the second item of information and a second part of the third item of information correspond to a permission of usage of a second function of the image-outputting apparatus.

The image-inputting apparatus includes an operation section that is operated to activate a function of the image-inputting apparatus. The operation section is also operated to change a value of the first item of information in accordance with the first determination made by the first decision section.

The image inputting apparatus includes an interface and a function restriction ID storing section. The image-inputting apparatus communicates with an external apparatus through an interface. The first item of information and the second item of information are inputted into the function restriction ID storing section through the interface.

The image-inputting apparatus includes an interface through which the image-inputting apparatus communicates with an external apparatus. When the first item of information and image data are inputted into the image-inputting apparatus through the interface, the image-outputting apparatus receives the first item of information through the image-inputting apparatus and the second decision section makes the second determination as to whether the image data should be outputted.

The third item of information describes whether the first item of information is permitted to use a predetermined function of the image-outputting apparatus. The second decision section makes the second determination based on the third item of information as to whether the image data should be outputted using a predetermined function or without using the predetermined function.

An image-inputting apparatus receives an image. The image-inputting apparatus includes an information receiving section, a decision section, and a transmitter. The information receiving section receives a first item of information. The decision section makes a determination as to whether the first item of information should be permitted to use the image-inputting apparatus. The determination is made based on the first item of information (e.g., ID) inputted into the image-inputting apparatus and a second item of information (e.g., IDs) that has been registered previously in the image-inputting apparatus. The transmitter transmits the first item of information to an image-outputting apparatus. The image-inputting apparatus outputs the image to the image-outputting apparatus in accordance with the determination made by the decision section and a reply received from the image-outputting apparatus in response to transmission of the first item of information.

The image-inputting apparatus further includes an operation mode storing section that holds a selected operation mode. The image-inputting apparatus outputs the image to the image-outputting apparatus in accordance with the determination and the selected operation and a reply received from the image-outputting apparatus in response to transmission of the first item of information.

The image-inputting apparatus further includes a determination storing section that holds information on whether the decision section has made the determination. Only when the information held in the determination storing section indicates that the decision section has not made the determination yet, the image-inputting apparatus prompts inputting of the first item of information for the decision section to make the determination. When the decision section has made the determination, the determination storing section holds information indicative that the decision section has made the determination. When the image-inputting apparatus receives a reply from the image-outputting apparatus in response to transmission of the first item of information, the determination storing section is cleared prior to selection of another operation mode.

The image-inputting apparatus further includes a usage restriction section that holds information that describes whether usage of the image-inputting apparatus. Only when the information held in the usage restriction section indicates that usage of the image-inputting apparatus should be restricted, the image-inputting apparatus prompts inputting of the first item of information for the decision section to make the determination and the image-inputting apparatus outputs the image to the image-outputting apparatus in accordance with the determination and a reply received from the image-outputting apparatus in response to transmission of the first item of information.

The image-inputting apparatus further includes an operation section that is operated to activate a function of the image-inputting apparatus. The operation section is also operated to change a value of the first item of information in accordance with the determination made by the decision section.

The image-inputting apparatus further includes an interface through which the image-inputting apparatus communicates with an external apparatus; and a function restriction ID storing section into which the first item of information and the second item of information are inputted through the interface.

The image-inputting apparatus further includes an interface through which the image-inputting apparatus communicates with an external apparatus to receive the first item of information and image data. When the image-inputting apparatus receives the first item of information and image data through the interface, the received first item of information is transmitted to the image outputting apparatus. The image inputting apparatus determines based on the reply whether the input image data should be transmitted to the image outputting apparatus.

An image-outputting apparatus receives an image from an image-inputting apparatus and outputs the received image. The image-outputting apparatus includes:

a decision section that makes a determination as to whether a first item of information received from the image inputting apparatus should be permitted to use the image-outputting apparatus, the determination being made based on the first item of information and a second item of information that has been registered previously in the image-outputting apparatus; and a transmitter that transmits information indicative of the determination to the image-inputting apparatus.

The image-outputting further includes an amount-of-usage storing section that holds a second item of information on an amount of usage of the image-outputting apparatus in which the first item of information is permitted to use the image-outputting apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 20 illustrates the operation panel of a scanner according to the sixth embodiment;

FIG. 21 illustrates a function restriction ID according to the sixth embodiment;

FIG. 22 illustrates an example of printer restriction information that is stored in the printer restriction information storage in the printer;

FIGS. 24A-24F illustrate messages displayed on a display of the operation panel of the scanner;

FIG. 25 illustrates the sequence of checking the printing functions that the inputted function restriction ID is permitted to use;

FIGS. 26A-26G illustrate examples of key operations for setting the scanner function and the printer function;

FIGS. 33A-33G illustrate examples of key operations for selecting scanner functions when the operation section of a scanner is operated.

DETAILED DESCRIPTION OF THE INVENTION

The present invention will be described in detail with reference to the accompanying drawings.

First Embodiment

Figure 1:
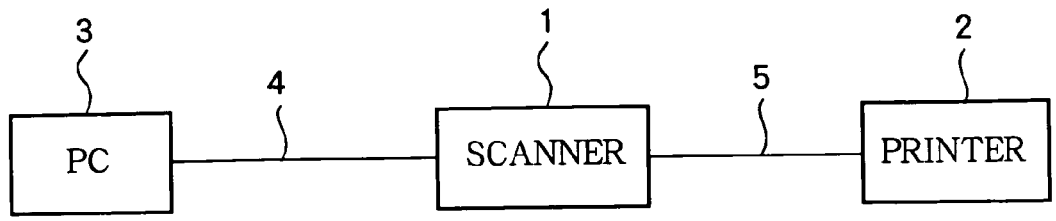
FIG. 1 is a schematic view of a multi-function composite system according to a first embodiment.

FIG. 1 is a schematic view of a multi-function composite system according to a first embodiment. Referring to FIG. 1, the multi-function composite system includes a scanner 1, printer 2, personal computer (PC) 3, network cable 4, and local cable 5. The scanner 1 communicates with the printer 2 through the local cable 5 and with the PC 3 through the network cable 4.

The multi-function composite system performs a copying function where the scanner 1 reads image data from an original and the printer 2 prints the image data; a transmitting function (referred to as SCAN-TO function) where the data read through the scanner 1 is transmitted to the PC 3 over the network cable 4; and a printing function where the data sent from the PC 3 to the printer 2 via the scanner 1 and the printer 2 prints the data.

The local cable 5 according to the first embodiment is in the form of a USB cable for use in a universal serial bus interface (USB interface). Alternatively, the local cable 5 may be a CENTRONICS CABLE for IEEE1284 interface, a cable for IEEE1394 interface, or a 10/100Base T cable for LAN interface.

{Scanner}

Figure 2:
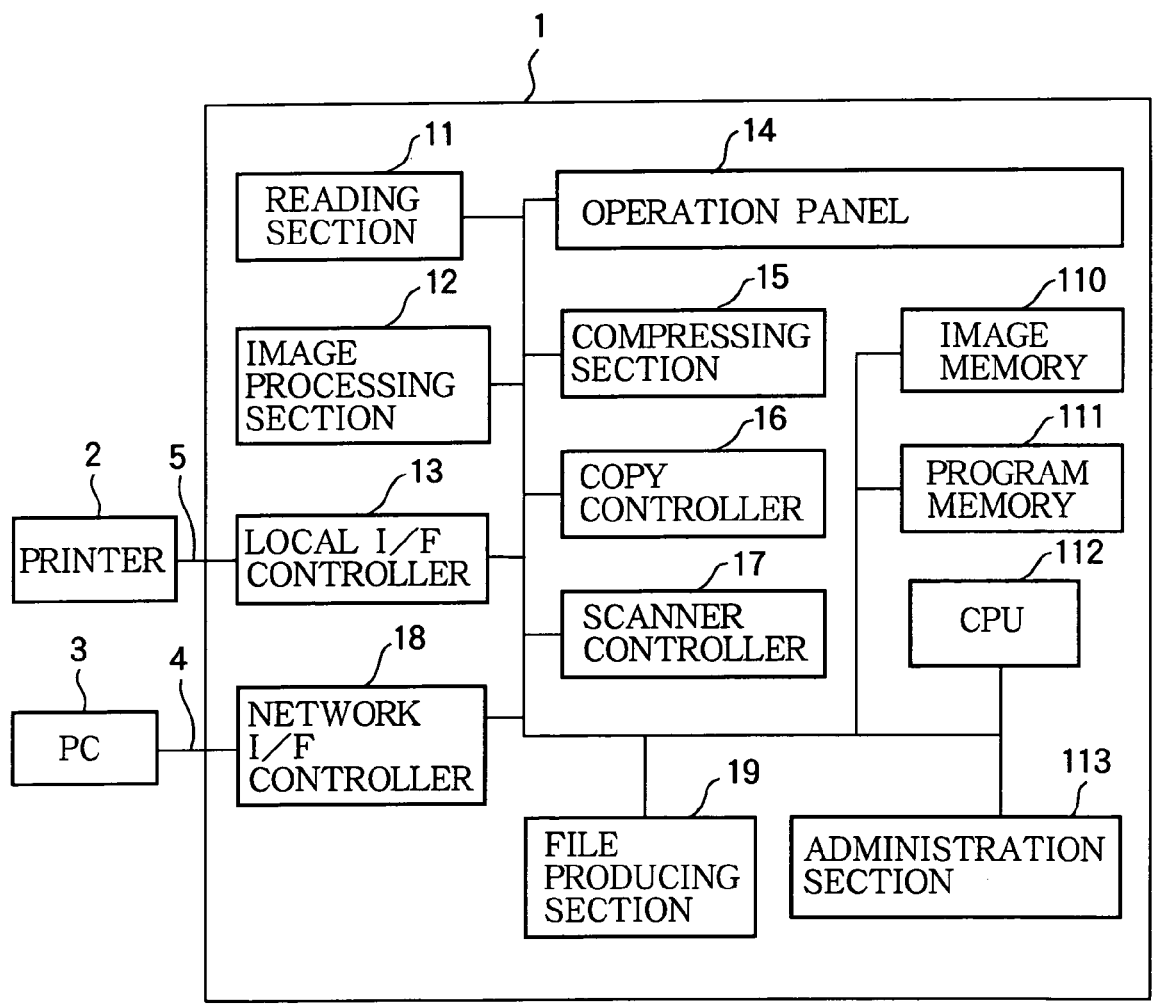
FIG. 2 is a block diagram illustrating a scanner.

FIG. 2 is a block diagram illustrating the scanner 1. Referring to FIG. 2, the scanner 1 includes a reading section 11, image processing section 12, a local I/F controller 13, operation panel 14, compressing section 15, copy controller 16, scanner controller 17, network I/F controller 18, file producing section for network transmission, image memory 110, program memory111 for a controller program, CPU 112, and administration section 113 for restricting the usage of the multi-function composite system.

The reading section 11 reads an image from an original. The image processing section 12 processes the image data read from the original. The local I/F controller 13 communicates with the printer 2 over the local cable 5 using a communication protocol, and controls the bi-directional communications of data. Alternatively, the local I/F controller 13 may control the bi-directional communications of data between the printer 2 using other communication protocol such as IEEE 1284 interface, IEEE1394 interface, or LAN interface.

The compressing section 15 compresses the data captured from the original. The copy controller 16 cooperates with the printer 2 to control a copy function and a print function. The scanner controller 17 controls the reading of the original under a command inputted from the operation panel 14 or a command received from the PC 3 via the network I/F controller 18.

The network I/F controller 18 is connected to the PC 3 through the network cable 4. The network I/F 18 controls and the reception of the print data from the PC 3 and the communication of commands between the PC 3 and the scanner 1 on the network, the transmission of the captured data that has been processed for network transmission. The file producing section 19 processes the data, read from the original, in such a format that can be sent over the network. The image memory 110 stores the image data read from the original and the processed data that has been subjected to image processing and image compression.

The program memory 111 stores control programs that run on the CPU 112. The CPU 112 controls the operations of the reading section 11, image processing section 12, local I/F controller 13, operation panel 14, compression section 15, copy controller 16, scanner controller 17, network I/F controller 18, file producing section 19, image memory 110, program memory 111, and administration section 113.

Figure 3:
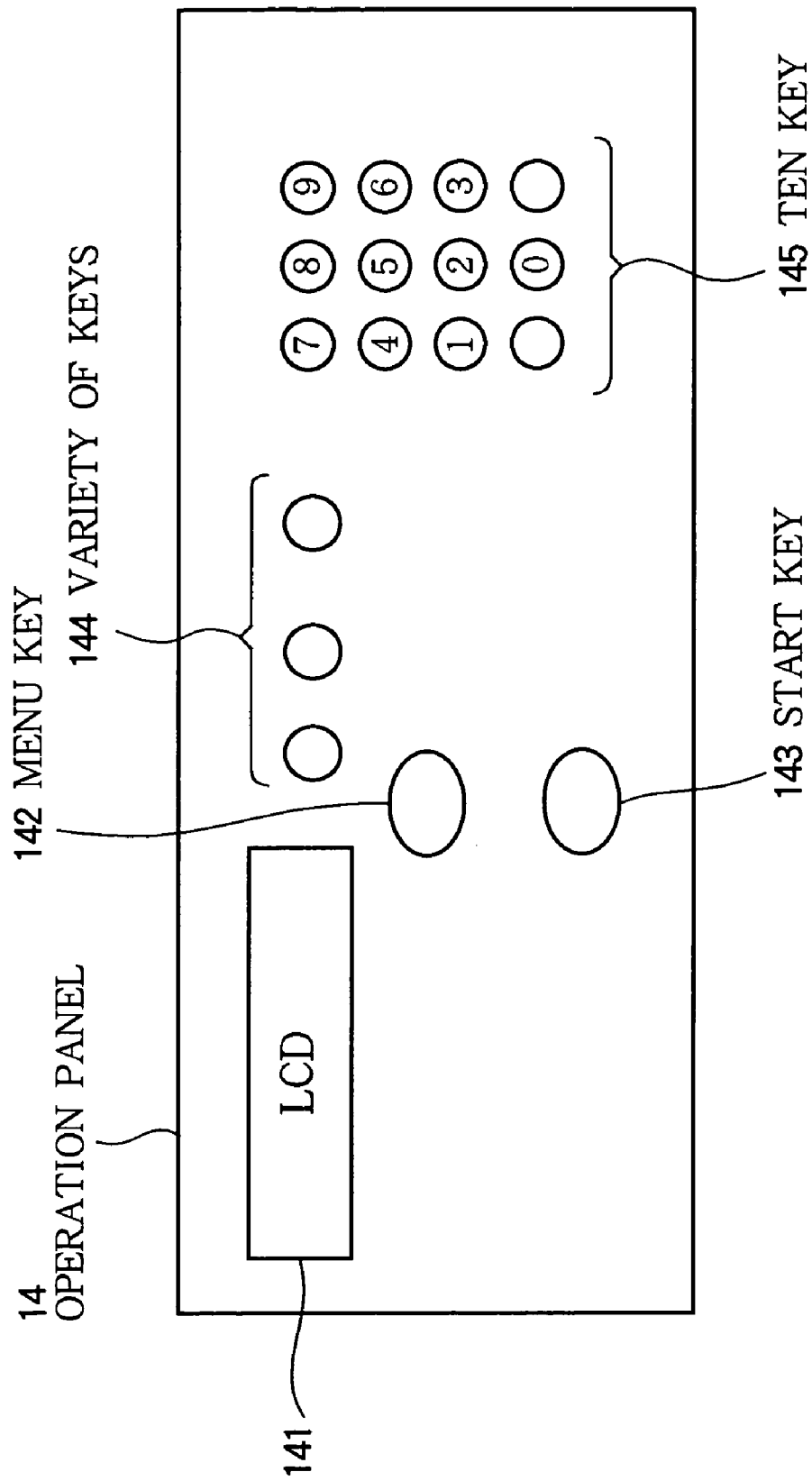
FIG. 3 illustrates an operation panel.

FIG. 3 illustrates the operation panel 14. Referring to FIG. 3, the operation panel 14 includes a liquid crystal display (LCD) 141, menu key 142, start key 143, a variety of keys 144, and ten key 145. The start key 143 is used to activate a desired operation. The ten key 145 is used to input alphanumeric characters into the scanner 1. The LCD 141 displays a display screen that allows a user to operate the scanner and select various settings.

Figure 4:
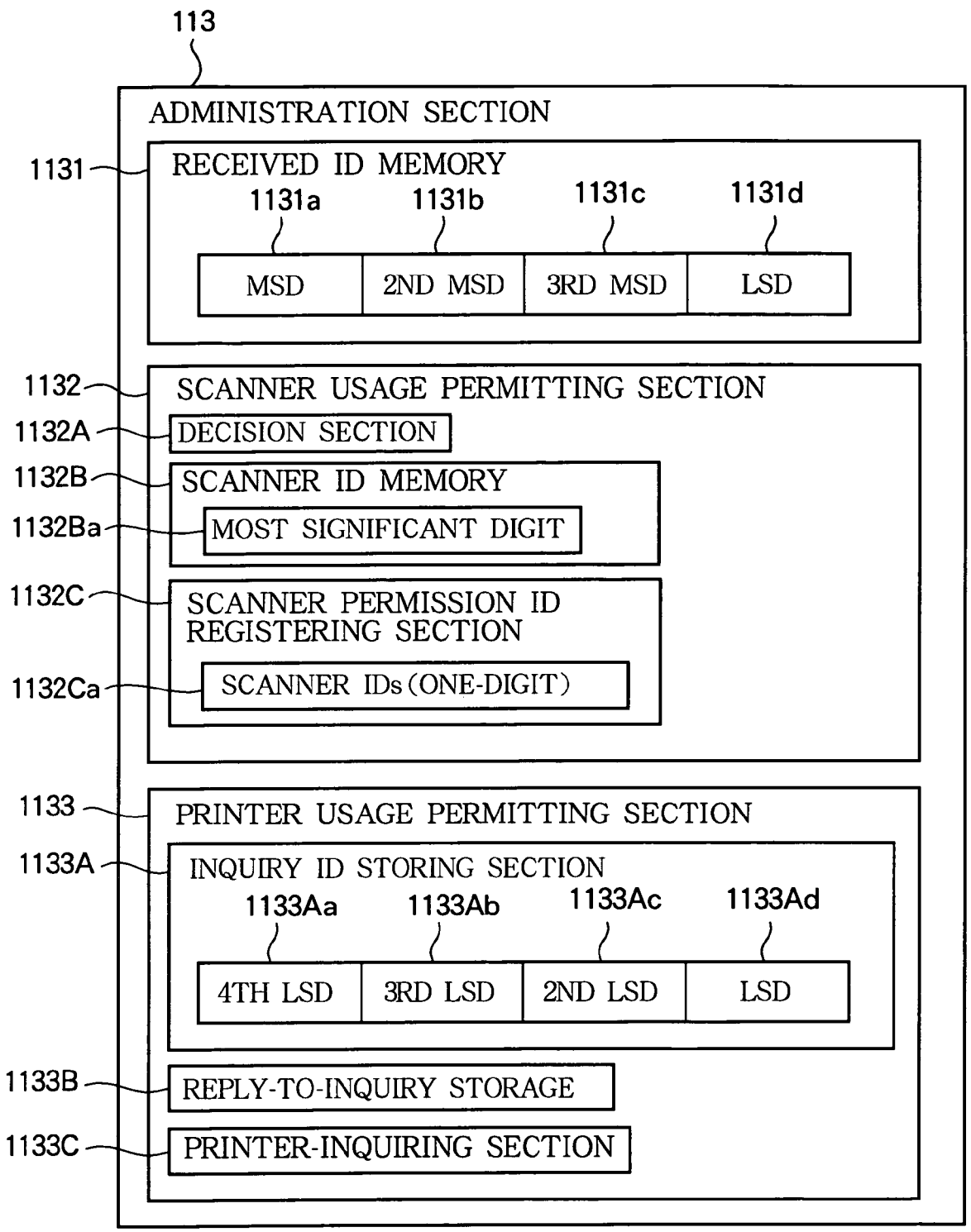
FIG. 4 illustrates the configuration of an administration section.

FIG. 4 illustrates the configuration of the administration section 113. Referring to FIG. 4, the administration section 113 includes a received ID memory 1131, scanner usage permitting section 1132, and printer usage permitting section 1133. The administration section 113 administrates the usage of the multi-function composite system according to the first embodiment.

The a received ID memory 1131 stores a 4-digit ID (user ID or personal ID) configured of alphanumeric characters: the most significant digit 1131a, second most significant digit 1131b, third most significant digit 1131c, and least significant digit 1131d. The ID may include five or more digits and the received ID memory 1131 may store an ID consisting of five or more digits accordingly.

A scanner usage permitting section 1132 includes a decision section 1132A, a scanner ID memory 1132B, and a scanner permission ID registering section 1132C. The scanner usage permitting section 1132 determines whether a user having an inputted ID should be permitted to use the scanner 12. The decision section 1132A compares a value of an ID held in the scanner ID memory 1132B with values of scanner usage permission IDs that have been registered previously in the scanner permission ID registering section 1132C, thereby determining whether a user should be permitted to use the scanner. The scanner ID memory 1132B stores the most significant digit 1132Ba of the 4-digit ID. The scanner ID memory 1132C stores one or more scanner IDs 1132Ca (one-digit) of users who are permitted to use the scanner 12.

When an ID held in the scanner ID memory 1132B is not coincident with any of the scanner usage permission IDs registered in the scanner permission ID register section 1132C, the decision section 132A does not permit the user having the ID to use the scanner 1. When an ID held in the scanner ID memory 1132B is coincident with one of the scanner usage permission IDs registered in the scanner permission ID register section 1132C, the decision section 1132A permits the usage of the scanner 1. Although the scanner ID memory 1132B and the scanner permission ID register section 1132C have a capacity of one-digit (1132Ba and 1132Ca), the capacity may be of a plurality of digits.

The scanner decision section 1133 includes an inquiry ID storing section 1133A, a reply-to-inquiry storage 1133B, and printer-inquiring section 1133C. The scanner decision section 113 controls the decision as to whether the usage of the printer should be permitted. The inquiry ID storing section 1133A stores the fourth least significant digit 1133Aa, the third least significant digit 1133Ab, the second least significant digit 1133Ac, and the least significant digit 1133Ad. Because the input ID includes four digits, the fourth, third, second, and first least significant digits 1133Aa, 1133Ab, 1133Ac, and 1133Ad in the inquiry ID storing section 1133A correspond to first, second, third, and fourth significant digits 1131a, 1131b, 1131c, and 1131d in the received ID memory 1131, respectively. The printer-inquiring section 1133C sends the lower four digits of the ID, stored in the inquiry ID storing section 133A, to the printer 2 to inquire whether the usage of the printer is permitted. Then, the printer-inquiring section 1133C receives a reply to the inquiry from the printer 2, and stores it into the reply-to-inquiry storage 1133B. While the inquiry ID storing section 1133A has a capacity of four digits in the first embodiment, the capacity may be less than four digits.

{Printer}

Figure 5:
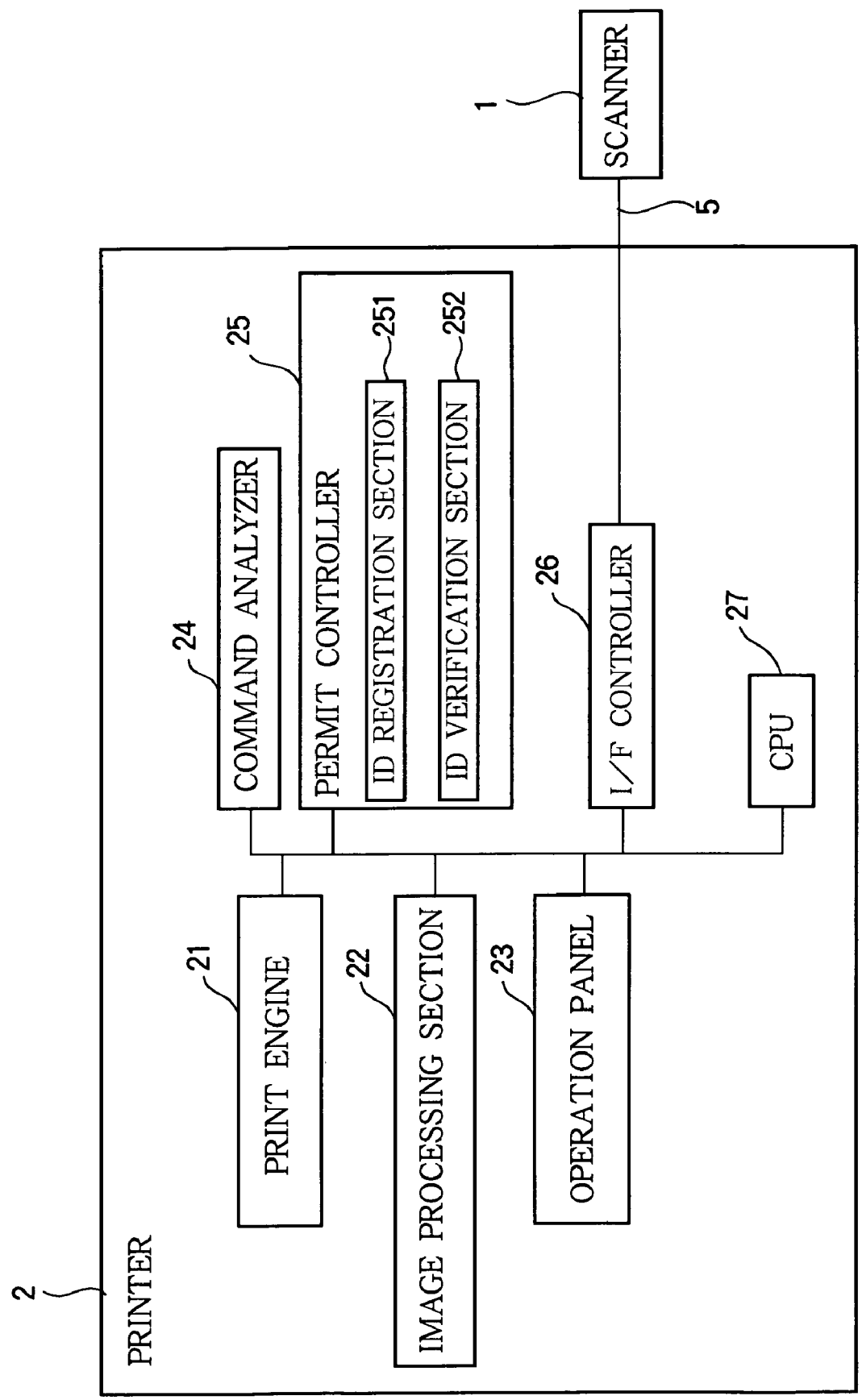
FIG. 5 is a block diagram of a printer.

FIG. 5 is a block diagram of the printer 2. Referring to FIG. 5, the printer 2 includes a print engine 21, image processing section 22, operation panel 23, command analyzer 24, permit controller 25, I/F controller 26, and CPU 27.

The print engine 21 performs printing. The image processing section 22 processes images to be printed. The operation panel 23 allows a user to select various settings of the printer 2. The command analyzer 24 analyzes commands received from the scanner 1.

The I/F controller 26 is connected to the local I/F controller 13 via the local cable 5, and controls the bi-directional communication of data between the printer 2 using a communication protocol. While the I/F controller 26 operates according to a communication protocol, the I/F controller 26 may also operate according to other communication protocol such as IEEE1284 interface, IEEE1394 interface, or LAN interface.

The CPU 27 controls the operations of the image processing section 22, operation panel 23, command analyzer 24, permit controller 25, and the I/F controller 26, which cooperate with one another under control of the CPU 27.

The permit controller 25 includes an ID registering section 251 and an ID verification section 252, and performs control as to whether a user should be permitted to use the printer 2. The ID registering section 251 holds one or more 4-digit printer permit IDs assigned to each of the users who are permitted to use the printer 2. The ID verification section 252 verifies whether an ID received from the scanner 1 is coincident with any one of the printer permit IDs registered in the ID registering section 251, thereby determining whether the user should be permitted to use the printer 2. Then, the ID verification section 252 sends the verification result to the scanner 1.

The permit controller 25 also checks ID information, received from an external apparatus such as a PC, against the registered ID information, and then outputs a check result. When an ID received from the scanner 1 is not coincident with any of the printer permit IDs and thus printing of the data received from the scanner 1 is inhibited, the ID verification section 252 sends a reply indicative of invalid verification in response to an inquiry from the scanner 1. When an ID received from the scanner 1 is coincident with one of the printer permit IDs and thus printing of the data received from the scanner 1 is permitted, the ID verification section 252 sends a reply indicative of valid verification in response to an inquiry from the scanner 1.

{Operation}

{Registering ID}

The operation of the first embodiment will be described.

A description will first be given of a method of registering an ID into the scanner permission ID registering section 1132C and the ID registering section 251. The scanner usage permission IDs are registered into the scanner permission ID registering section 1132C from the operation panel 14 of the scanner 1. Specifically, just as when other settings are input, the user operates keys on the operation panel 14 to input the scanner usage permission IDs, watching the LCD 141.

The printer permit IDs may be registered into the ID registering section 251 from the operation panel 14 of the scanner 1 in much the same way that the scanner usage permission IDs are registered into the scanner permission ID registering section 1132C. Alternatively, the printer permit IDs may be registered from the operation panel 23 of the printer 2 by using the network utility, provided in the printer 2, for administration and registration of IDs. When the printer permit IDs are registered from the operation panel 14 of the scanner 1, the ID data is inputted through the operation panel 14. The copy controller 16 produces an ID and transmits the ID to the printer 2.

{Usage Permit Processing}

Figure 6:
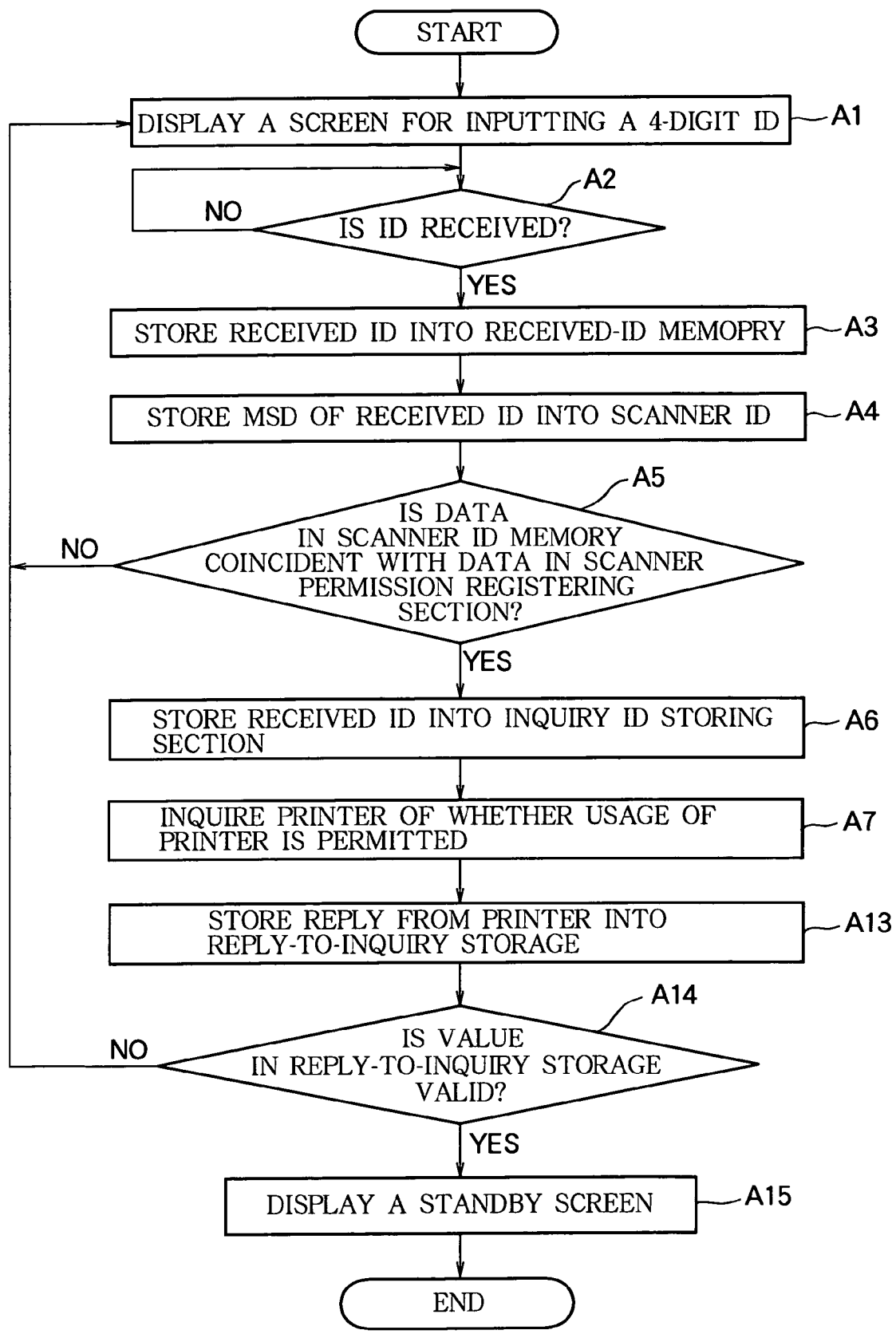
FIG. 6 illustrates the processing carried out in the scanner.
Figure 7:
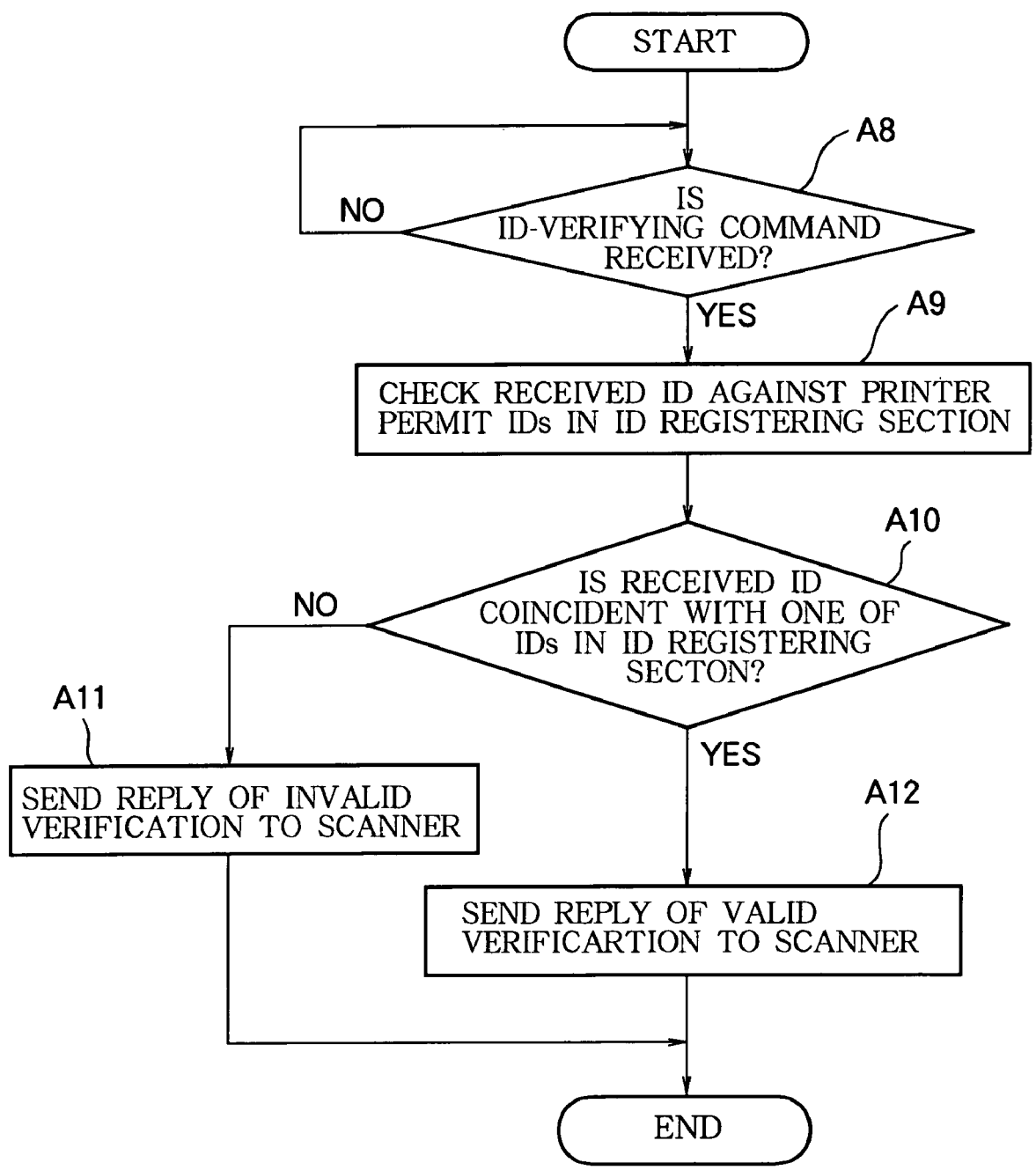
FIG. 7 illustrates the processing carried out in the printer.

FIGS. 6 and 7 are flowcharts illustrating a usage permit processing according to the first embodiment. FIG. 6 illustrates the processing carried out in the scanner and FIG. 7 illustrates the processing carried out in the printer 2.

Referring to FIG. 6, the operation panel 14 of the scanner 1 displays a display screen for inputting a 4-digit ID (step A1), and a check is made to determine whether an ID is inputted (step A2). When an ID is inputted, the ID is stored into the received ID memory 1131 (step A3) and the most significant digit of the ID is stored into the scanner ID memory 1132B (step A4).

The decision section 1132A compares a value of the most significant digit of the ID stored in the scanner ID memory 1132B with values of the scanner usage permission IDs that have been registered previously in the scanner permission ID registering section 1132C (step A5). If they are not coincident with each other, then the program loops back to step A1 where the operation panel 14 of the scanner 1 again displays a display screen that prompts the user to input a 4-digit ID.

If they are coincident with each other, then the 4-digit ID held in the received ID memory 1131 is fetched into the inquiry ID storing section 1133A (step A6). Thus, the scanner 1 can send an inquiry to the printer 2 as to whether the usage of the printer 2 is permitted.

The printer-inquiring section 1133C sends an ID-verifying command and the ID held in the inquiry ID storing section 1133A to the printer 2, thereby inquiring whether usage of the printer 2 is permitted (step A7).

Referring to FIG. 7, the printer 2 determines whether an ID-verifying command is received from the scanner 1 (step A8). Upon receiving an ID-verifying command from the scanner 1, the ID verification section 252 checks the ID received from the scanner 1 against the printer, permit IDs stored in the ID registering section 251 (step A9), thereby determining whether the ID received from the scanner 1 is the same as one of the IDs that have been previously registered in the ID registering section 251 (step A10).

If the answer is "NO" at step A10, the ID verification section 252 sends a reply of invalid verification to the scanner 1 (step A11). If the answer is "YES" at step A10, the ID verification section 252 sends a reply of valid verification to the scanner 1 (step A12).

Upon receiving a reply from the printer 2 to the inquiry sent at step A7 (FIG. 6) (steps A11 or A12), the scanner 1 stores the reply into the reply-to-inquiry storage 1133B (step A13). Then, a check is made to determine whether the value held in the reply-to-inquiry storage 1133B is valid (OK) (step A14).

If the answer at step A14 is "YES", it is determined that the input ID is accepted by the printer 2, and the operation panel 14 displays a standby screen such as a mode selection screen implying that the user having the ID is permitted to use the scanner 1 and printer 2 (step A15). If the answer at step A14 is "NO", then the program loops back to step A1 where the operation panel 14 again displays a display screen that prompts the user to input an ID.

{Copy Mode}

Figure 8:
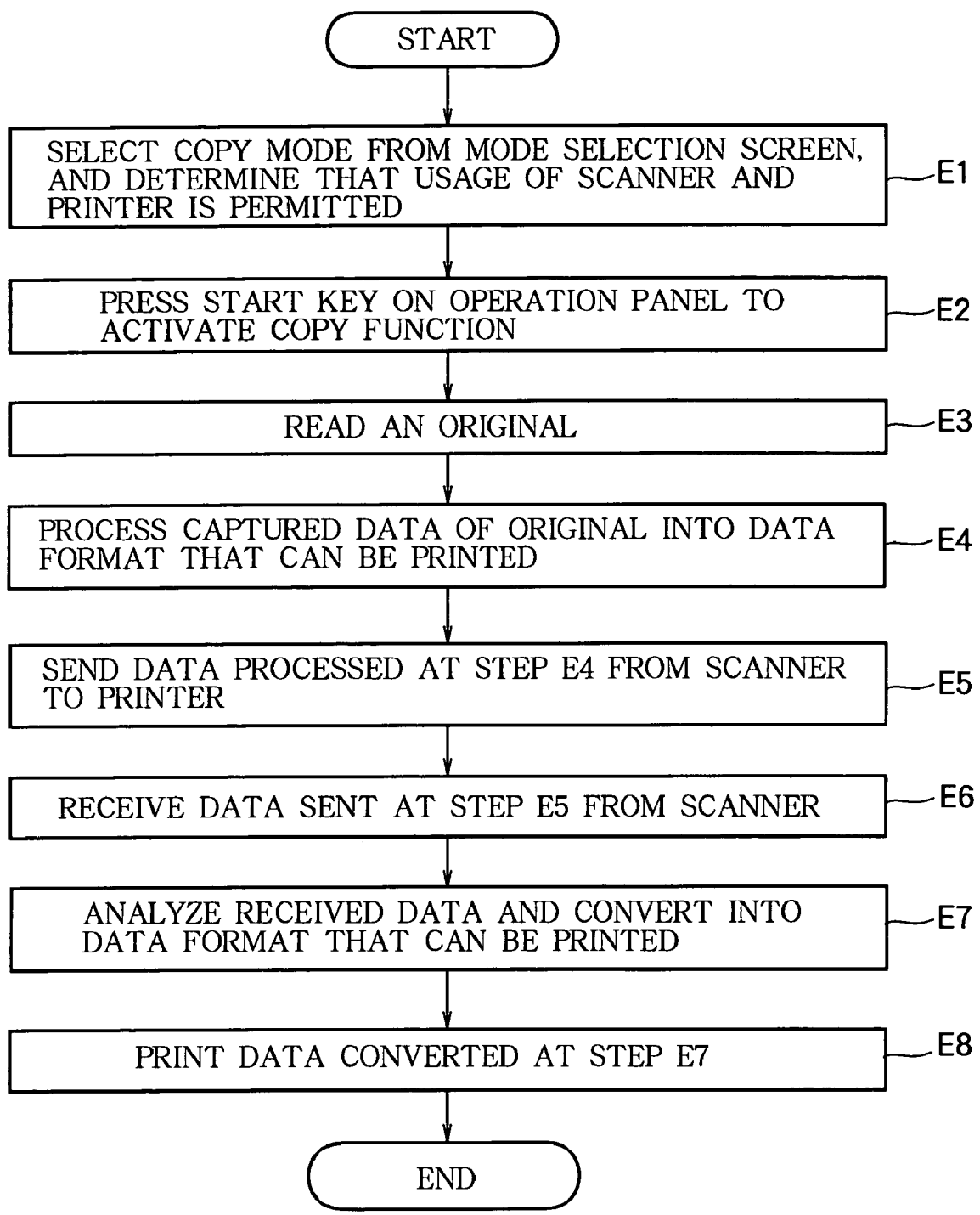
FIG. 8 is a flowchart illustrating the operations of the scanner and the printer in a copy mode after it is determined that the user is permitted to use the printer.

FIG. 8 is a flowchart illustrating the operations of the scanner 1 and the printer 2 in a copy mode after it is determined that the user is permitted to use the printer 2. The copy mode is selected from the mode selection screen of the operation panel 14 and then it is determined by the usage permit processing in FIGS. 6 and 7 that usage of the scanner 1 and printer 2 is permitted (step E1). When the standby screen is being displayed, if the start key 143 on the operation panel 14 is pressed to activate a copy function (step E2), then the scanner 1 reads an original (step E3).

The data of the original captured at step E3 is processed in the image processing section 12 (step E4). Then, the data processed at step E4 is transmitted together with the ID information via the USB from the local I/F controller 13 to the I/F controller 26 (step E5).

When the I/F controller 26 receives the data from the scanner 1 (step E6), the command analyzer 24 analyzes the data and converts the data into a data format that can be accepted by the print engine 21 (step E7). Then, the printing engine 21 prints the converted data (step E8). The copy function is a series of the aforementioned steps.

{SCAN-TO Mode}

Figure 9:
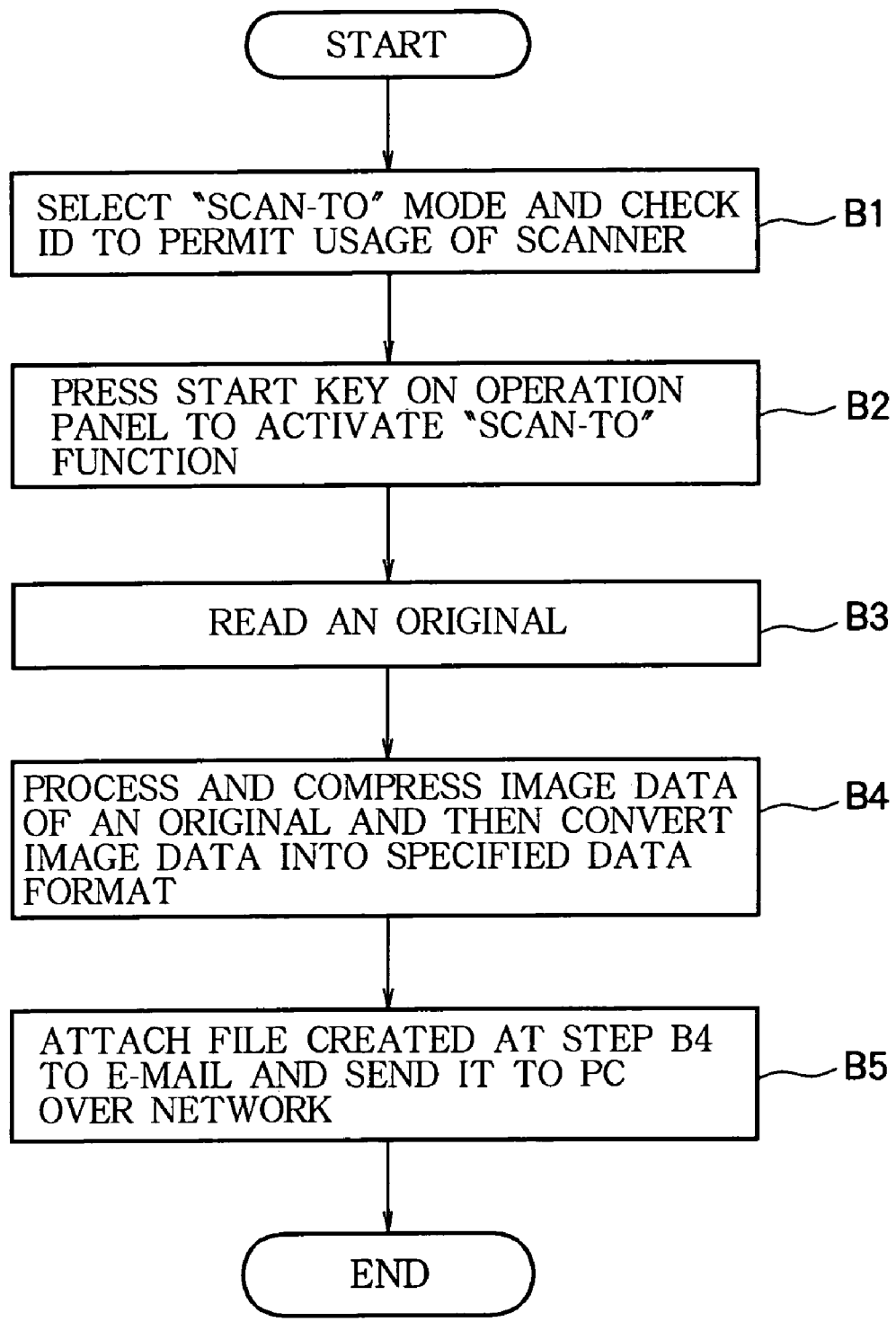
FIG. 9 is a flowchart illustrating the operation of the scanner in a SCAN-TO mode (i.e., e-mail mode) after it is determined that the user is permitted to use the printer.

FIG. 9 is a flowchart illustrating the operation of the scanner 1 in the SCAN-TO mode (i.e., e-mail mode) after it is determined that the printer 2 can be used.

The SCAN-TO mode (e-mail mode) is selected from the mode selection screen of the operation panel 14, and then it is determined by the usage permit processing in FIGS. 6 and 7 that usage of the scanner 1 is permitted (step B1). When the standby screen is being displayed on the operation panel 14, if the start key 143 is pressed to activate the SCAN-TO function (step B2) the scanner 1 reads an original (step B3).

The image data of the original read at step B3 is processed in the image processing section 12, is then compressed in the compressing section 15, and is finally converted into a specified data format (step B4).

Then, the file producing section 19 attaches a file created at step B4 to an e-mail. Then, the network I/F controller 18 transmits the file and the e-mail to the PC 3 on the network (step B5). The SCAN-TO function is a series of the aforementioned steps.

{Print Mode}

Figure 10:
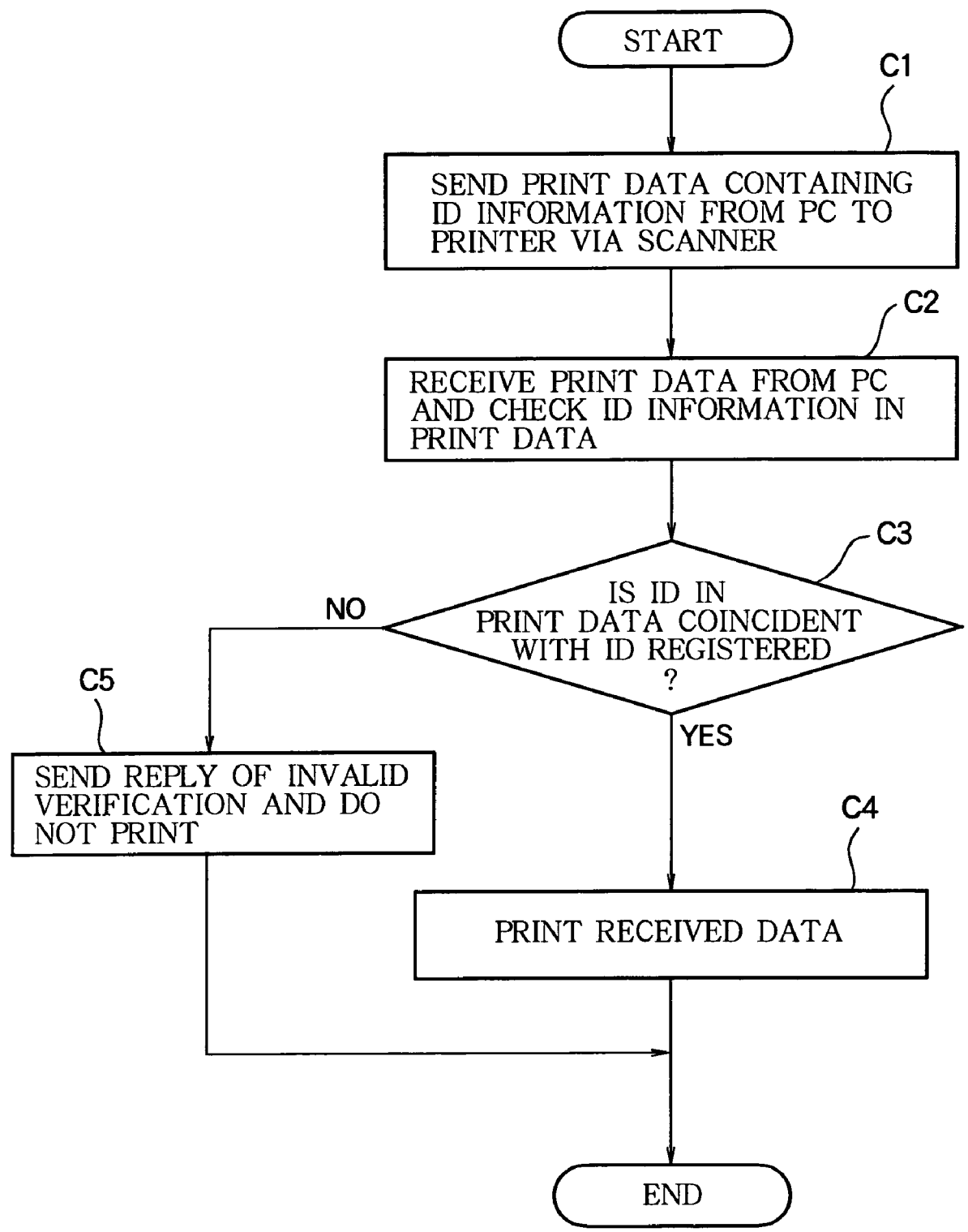
FIG. 10 is a flowchart illustrating the operations of the scanner and the printer in a print mode after it is determined that the user is permitted to use the printer.

FIG. 10 is a flowchart illustrating the operations of the scanner 1 and the printer 2 in a print mode after it is determined that the user is permitted to use the printer 2. In the print mode, the print data received from the PC3 merely passes through the scanner 1 to the printer 2. Therefore, the ID is checked in the PC3 and the printer 2. When the PC3 sends the print data together with ID information to the scanner 1, the scanner 1 merely transfers the print data to the printer 2 without checking the content of the print data (step C1).

The printer 2 receives the print data from the PC3 via the scanner 1 and checks the ID contained in the print data (step C2), and the permit controller 25 determines whether the received ID is coincident with one of the registered IDs (step C3).

If the received ID is coincident with one of the registered IDs, the printer 2 prints the print data (step C4) If the received ID is not coincident with any of the registered IDs, the printer 2 does not print the received print data and sends a reply of invalid verification to the PC3 via the scanner 1 (step C5).

As described above, inputting an ID one time allows the restriction of usage of both the scanner 1 and the printer 2, simplifying the usage permit processing in which usage of the multi-function composite system is restricted.

The scanner 1 is only required to hold part of the ID for restricting the usage of the multi-function composite system. Therefore, the memory of the scanner 1 that holds an ID used for restricting the usage need not have as large a capacity as that of the printer 2.

While the first embodiment has been described with respect to the ID information inputted from the operation panel, a card that holds the ID information may be inserted into the scanner 1 for allowing the user to input the ID information. Still alternatively, the host PC may send the ID information to the scanner 1.

Second Embodiment

The configuration of a multi-function composite system according to a second embodiment is much the same as the first embodiment except that an operation panel 14 and an administration section 113 of a scanner 1 differ from those of the first embodiment.

Figure 11:
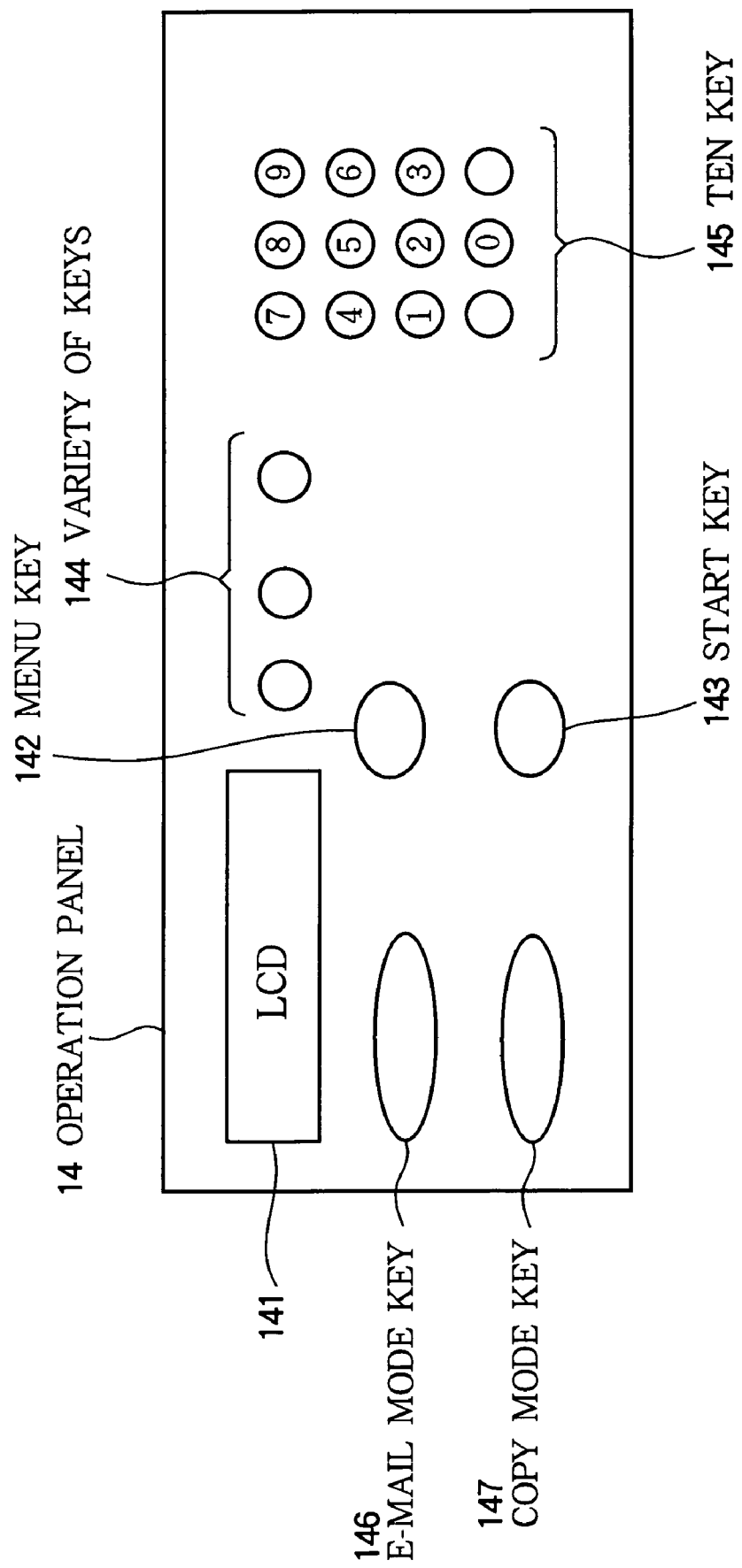
FIG. 11 illustrates the configuration of an operation panel of a scanner according to a second embodiment.

FIG. 11 illustrates the configuration of the operation panel 14 of the scanner 1 according to a second embodiment. Similar elements to those in the first embodiment have been given the same reference numerals. The operation panel 14 in FIG. 11 includes an LCD 141, memory 142, start key 143, a variety of keys 144, ten key 145, e-mail mode key 146, and copy mode key 147. The second embodiment differs from the first embodiment-in that the e-mail mode key 146 and copy mode key 147 are provided.

Figure 12:
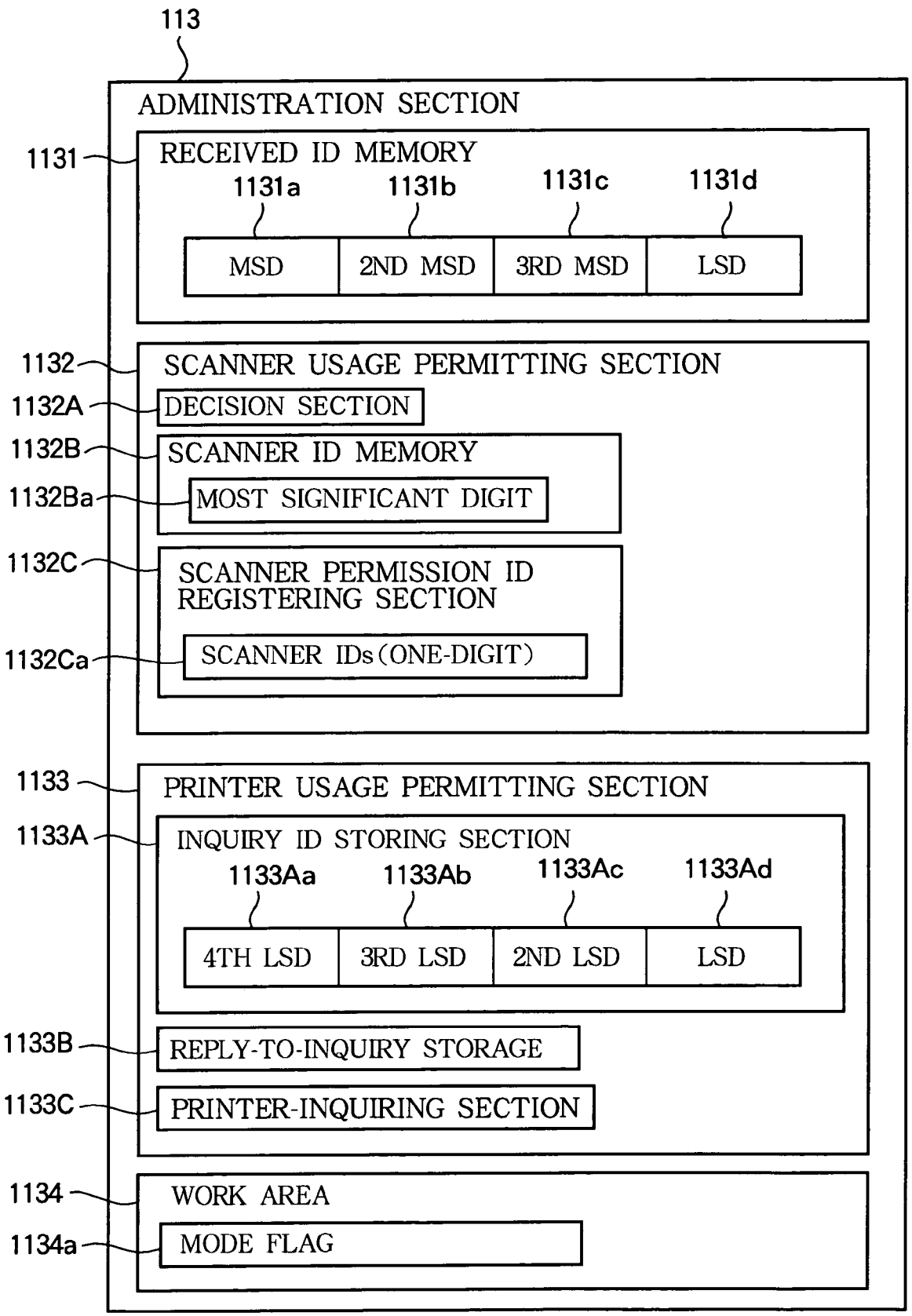
FIG. 12 illustrates the configuration of an administration section of a scanner.

FIG. 12 illustrates the configuration of an administration section 113 of the scanner 1. Similar elements to those in the first embodiment have been given the same reference numerals. The administration section 113 includes a received ID memory 1131, a scanner usage permitting section 1132, and a printer usage permitting section 1133, and a work area 1134. The administration section 113 according to the second embodiment differs from that of first embodiment in that the work area 1134 is provided and holds a mode flag 1134a as information indicative of either a copy mode or an e-mail mode.

Figure 13:
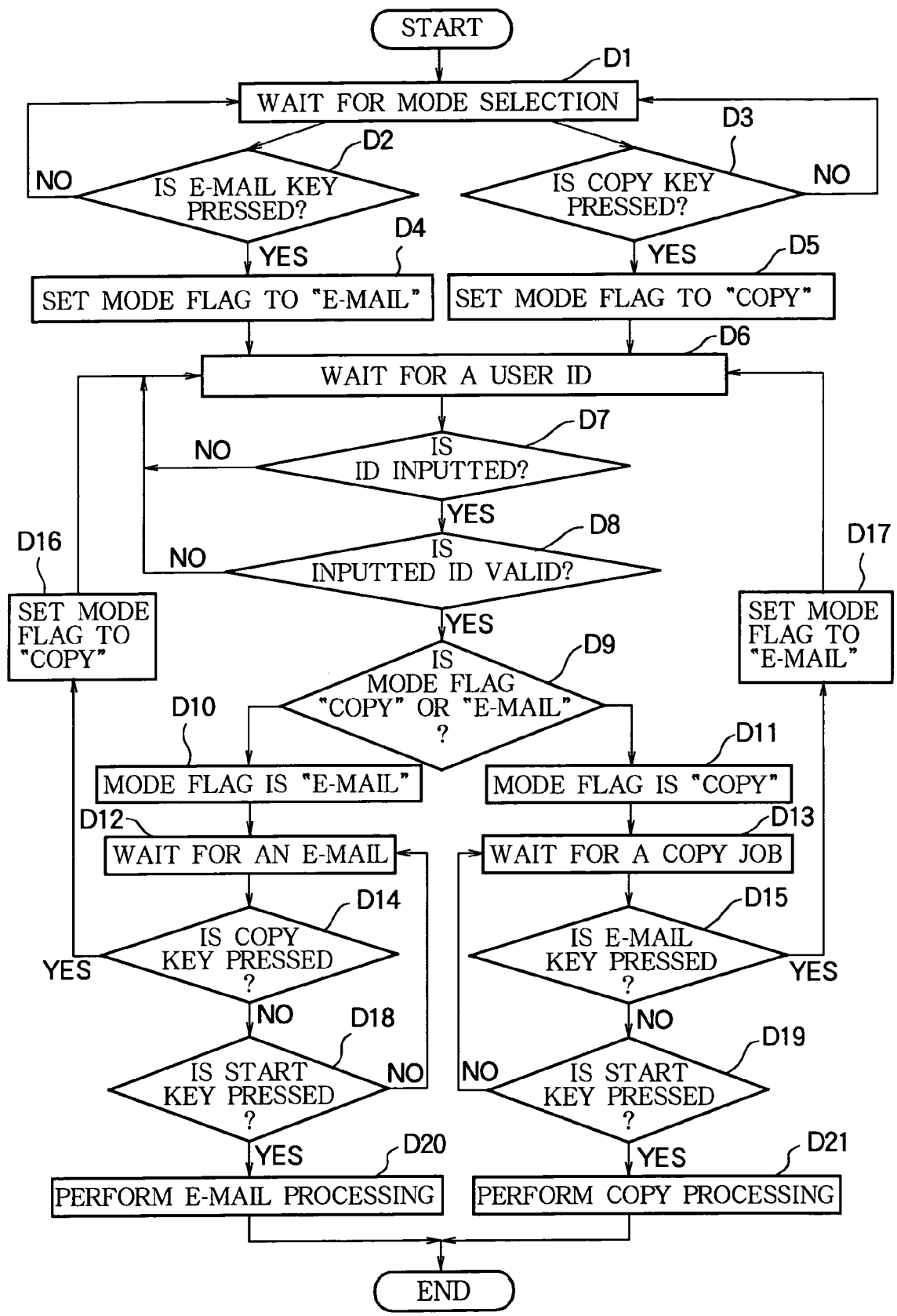
FIG. 13 is a flowchart illustrating a series of operations in the second embodiment.

The operation of the second embodiment will be described. FIG. 13 is a flowchart illustrating a sequence of operations in the second embodiment. Assume that the multi-function composite system is in a mode selection mode at step D1.

When a user presses the e-mail mode key 146 on the operation panel 14 (step D2), the mode flag 1134a is set to a value (referred to as "E-MAIL") indicative of the e-mail mode (step D4) and then the program waits for a user ID (step D6).

When the copy mode key 147 is pressed at step D1, the mode flag 1134a is set to a value (referred to as "COPY") (step D5) and then the program waits for a user ID (step D6).

When an ID is inputted (step D7), the permit controller 25 checks the inputted ID information against the registered ID information (step D8). If the inputted ID is valid (OK) at step D8, the program proceeds to step D9. If the inputted ID is invalid (NG) at step D8, then the program loops back to step D6 where the program waits for a user ID. The steps D6 to D8 are the same as steps A1 to A15 in FIG. 6.

If the inputted ID is valid (OK) at step D8, the program checks the content or value of the mode flag 1134a (step D9).

If the answer at step D9 is "E-MAIL" (step D10), then the program proceeds to step D12 where the program waits for an e-mail.

If the copy mode key 147 is pressed (step D14) when the program is waiting for an e-mail, the mode flag 1134a is set to "COPY" (step D16), and then the program proceeds back to step D6.

If the start key 143 is pressed instead of the copy mode key 147 at step D14 (step D18), the program performs an e-mail processing (step D20). When the e-mail processing has been completed, the program ends. The e-mail processing at step D20 is the same as the operation at steps B3-B5 in FIG. 9, i.e., processing where image data that has been read from an original is sent together with an e-mail at step B5.

If the start key 143 is not pressed at step D18, then the program jumps back to step D12 where the program waits for an e-mail.

If the answer is "COPY" at step D9 and D11, then the program proceeds to step D13 where the program enters a copy standby state.

When the e-mail mode key 146 is pressed at step D15, the mode flag 1134a is set to "E-MAIL." In other word, the content or value of the mode flag 1134a is changed from "COPY" to "E-MAIL" (step D17). Then, the program returns to step D6.

If the start key 143 is pressed instead of the e-mail mode key 146 (step D19), the copy processing is carried out (step D21). When the copy processing has been completed, the program ends. The copy processing at step D21 is the same as the operation performed at steps E3-E8 in FIG. 8.

If the start key 143 is not pressed at step D19, then the program returns to step D13 where the program enters a copy standby state.

According to the second embodiment, when the apparatus is in a standby state after power-up of the apparatus or completion of one operation mode, a mode selection screen is displayed. The administration section 113 has the work area 1134 that stores a selected operation mode. After the selected operation mode has been stored in the work area 1134, the user is prompted to input an ID. A check is made to determine whether the user having the inputted ID should be permitted to use the scanner 1 and printer 2. Then, the apparatus shifts to a standby state corresponding to a mode provided in the apparatus. This implies that an ID is checked on a mode-by-mode basis to improve the usability of the apparatus.

Third Embodiment

The configuration of a multi-function composite system according to a third embodiment is much the same as that of the second embodiment. The third embodiment differs from the second embodiment in the configuration of a work area 1134 of an administration section 113.

{Construction}

Figure 14:
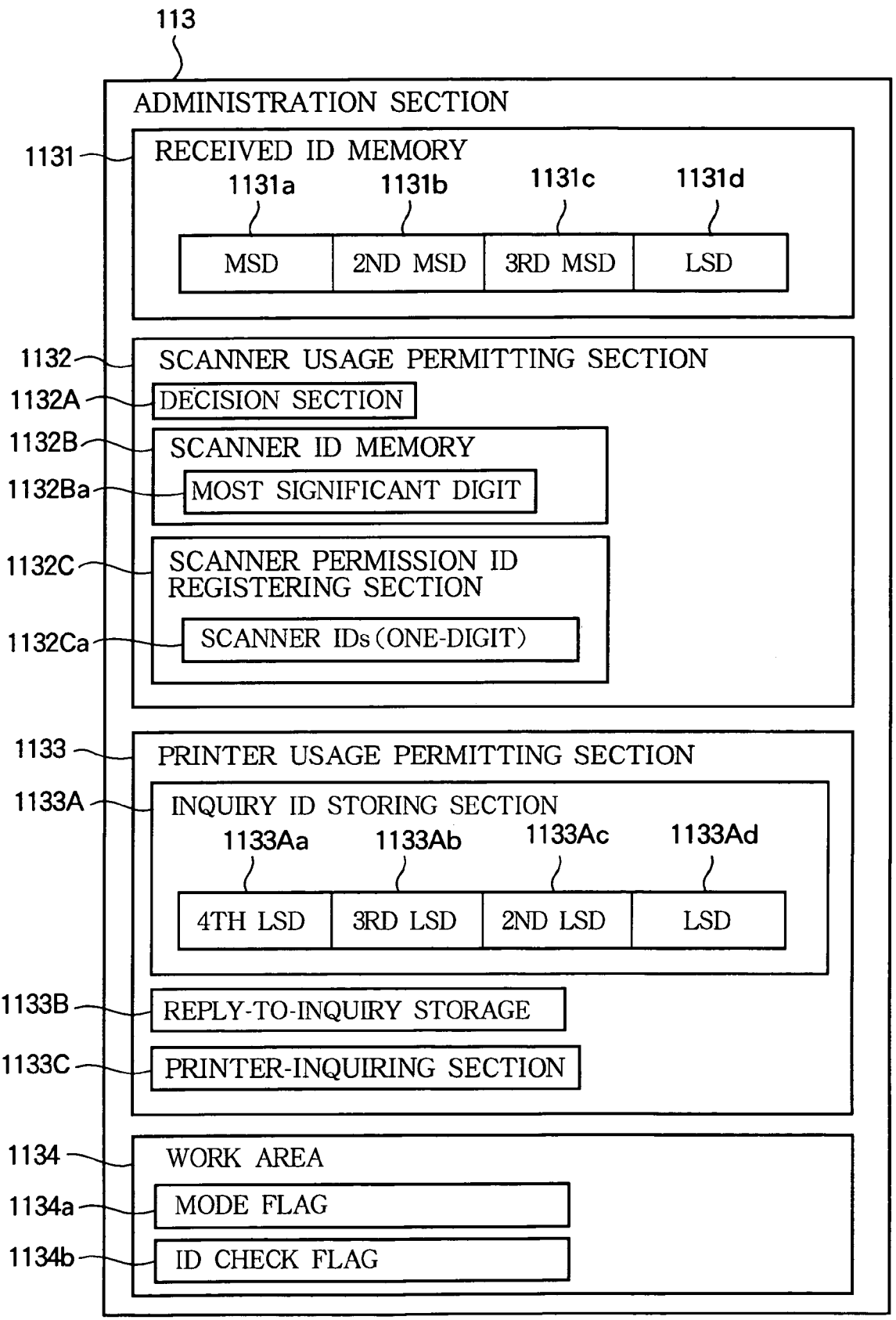
FIG. 14 illustrates the configuration of the administration section.

FIG. 14 illustrates the configuration of the administration section 113 of a scanner 1. Similar elements to those in FIG. 12 have been given the same reference numerals. Just as in the second embodiment, the administration section 113 according to the third embodiment includes a received ID memory 1131, scanner usage permitting section 1132, and printer usage permitting section 1133, and the work area 1134. The work area 1134 includes a mode flag 1134a that holds an operation mode: either a copy mode or an e-mail mode. The work area 1134 also includes an ID check flag 1134b that holds information on whether an inputted ID has been checked. The ID check flag 1134b is set to "ON" when the ID is found to be valid, and "OFF" shortly after power-on of the apparatus or completion of an operation in the copy mode and in the e-mail mode. The state "OFF" implies that the ID has not been checked yet.

{Operation}

Figure 15:
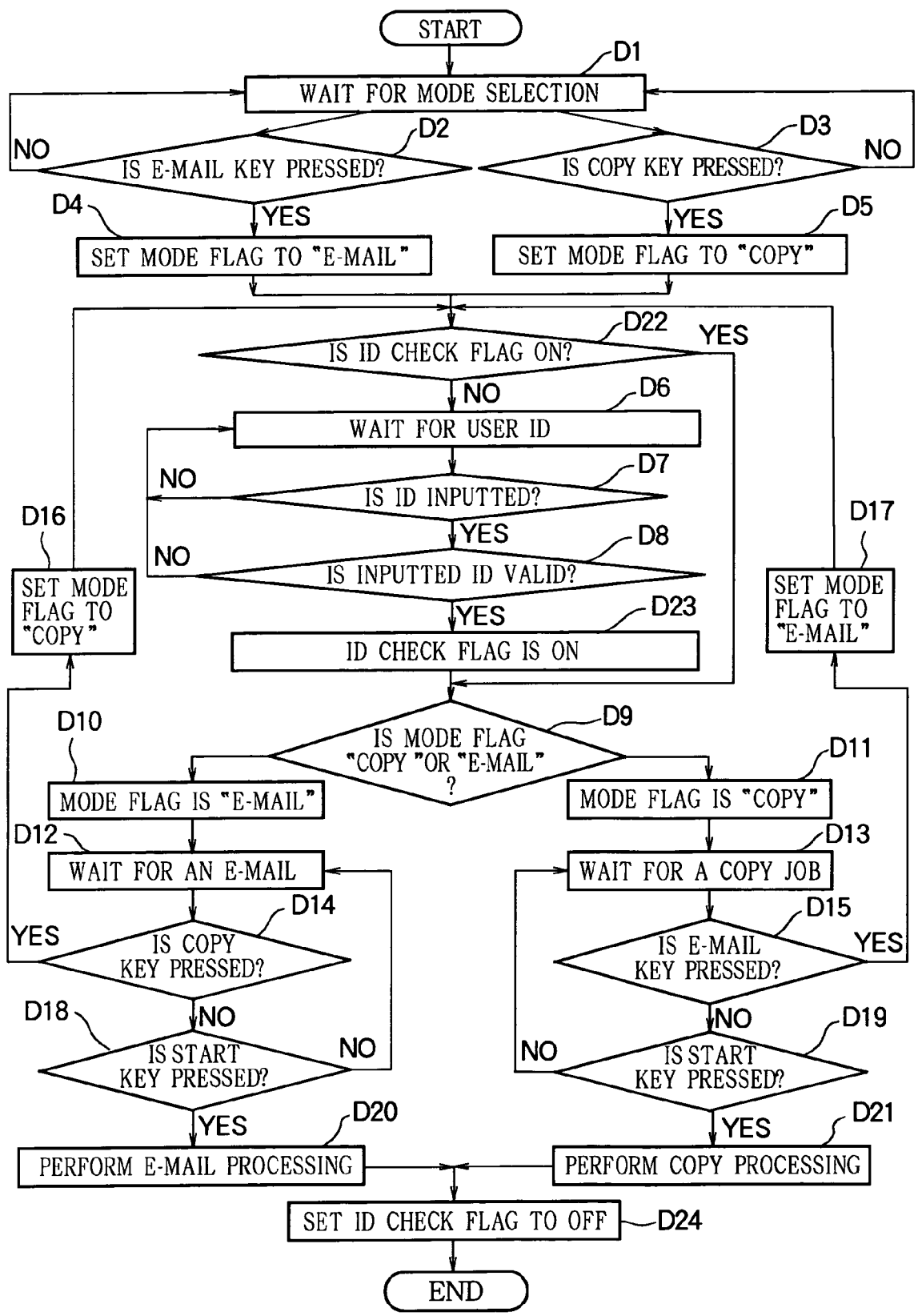
FIG. 15 is a flowchart illustrating a series of operations in a third embodiment.

The operation of the third embodiment will be described. FIG. 15 is a flowchart illustrating a sequence of operations in the third embodiment. Referring to FIG. 15, assume that the multi-function composite system is waiting for a selection of mode.

When the program is in a standby state at step D1, if a user presses the e-mail mode key 146 on the operation panel 14 (step D2), the mode flag 1134a stores a value (referred to as "E-MAIL" hereinafter) indicative of the e-mail mode (step D4) and then the program checks the ID check flag 1134b (step D22). If the ID check flag 1134b is "OFF", then the program proceeds through steps D6 to D8 where an ID is inputted and the inputted ID is checked against the registered items of ID information (IDs) (step D8). If the ID check flag 1134b is "ON", then the program does not proceed through steps D6 to D8 but proceeds to step D9 where the mode flag 1134a is checked. Because the ID check flag 1134b was initially "OFF," operations at steps D6-D8 are performed.

If the ID is found to be valid at step D8, the ID check flag 1134b is set to "ON" (step D23), and the mode flag 1134a is checked (step D9).

If the answer at step D9 is "E-MAIL" (step D10), then the program proceeds to step D12 where the program waits for an e-mail.

If the copy mode key 147 is pressed (step D14) when the program is waiting for an e-mail, the content of the mode flag 1134a is changed from "E-MAIL" to "COPY" (step D16), and then the program jumps back to step D22 where the ID check flag 1134b is checked. If the ID check flag 1134b is "OFF," the program proceeds through steps D6-D8 where inputted ID is checked. If the ID check flag 1134b is "ON," the program does not perform the operation performed at steps D6-D8 but proceeds to step D9 where the mode flag 1134a is checked. Because the operation of steps D6-D8 has been carried out at least one time and the ID check flag 1134b is "ON," the program does not perform the operation at D6-D8 and proceeds to step D9 where the mode flag 1134a is checked.

If the start key 143 is pressed instead of the copy mode key 147 (step D18), the e-mail processing is performed (step D20), and the ID check flag 1134b is set to "OFF" (step D24) thereby completing the sequence of operation in FIG. 15.

If the start key 143 is not pressed at step D18, the program returns to step D12 where the program waits for an e-mail.

If it is determined at step D9 that the mode flag 1134a holds "COPY" (step D11), then the program proceeds to step D13 where the program enters a copy standby state.

When the e-mail mode key 146 is pressed (step D15), the content of the mode flag 1134a is changed from "COPY" to "E-MAIL" (step D17), and the program returns to step D22 where the ID check flag 1134b is checked. If the ID check flag 1134b is "OFF," the operation at steps D6-D8 is performed. If the ID check flag 1134b is "ON," the operation at steps D6-D8 is not performed but the program proceeds to step D9 where the mode flag 1134a is checked. Because the operation at steps D6-D8 has been carried out at least one time and the ID check flag 1134b is "ON," the program does not perform the operation of D6-D8 but proceeds to step D9 where the mode flag 1134a is checked.

If the start key 143 is pressed instead of the e-mail mode key 16 (step D19), the copy processing is performed (step D21). The ID check flag 1134b is set to "OFF" after the copy processing (step D24), thereby completing the sequence of operation in FIG. 15.

If the start key 143 is not pressed at step D19, the program returns to step D13 where the program enters a copy standby state.

According to the third embodiment, the ID check flag 1134b is provided in the work area 1134 of the administration section 113. When the e-mail mode key 146 or the copy mode key 147 is pressed, the ID check flag 1134b is checked to determine whether an ID has been checked. If the ID has been checked, then an ID inputting screen is not displayed, so that the processing is simplified and the security and usability of the apparatus are improved.

Fourth Embodiment

The configuration of a multi-function composite system according to a fourth embodiment is much the same as that of the third embodiment. The fourth embodiment differs from the third embodiment in the configuration of an administration section 113 of a scanner 1.

{Construction}

Figure 16:
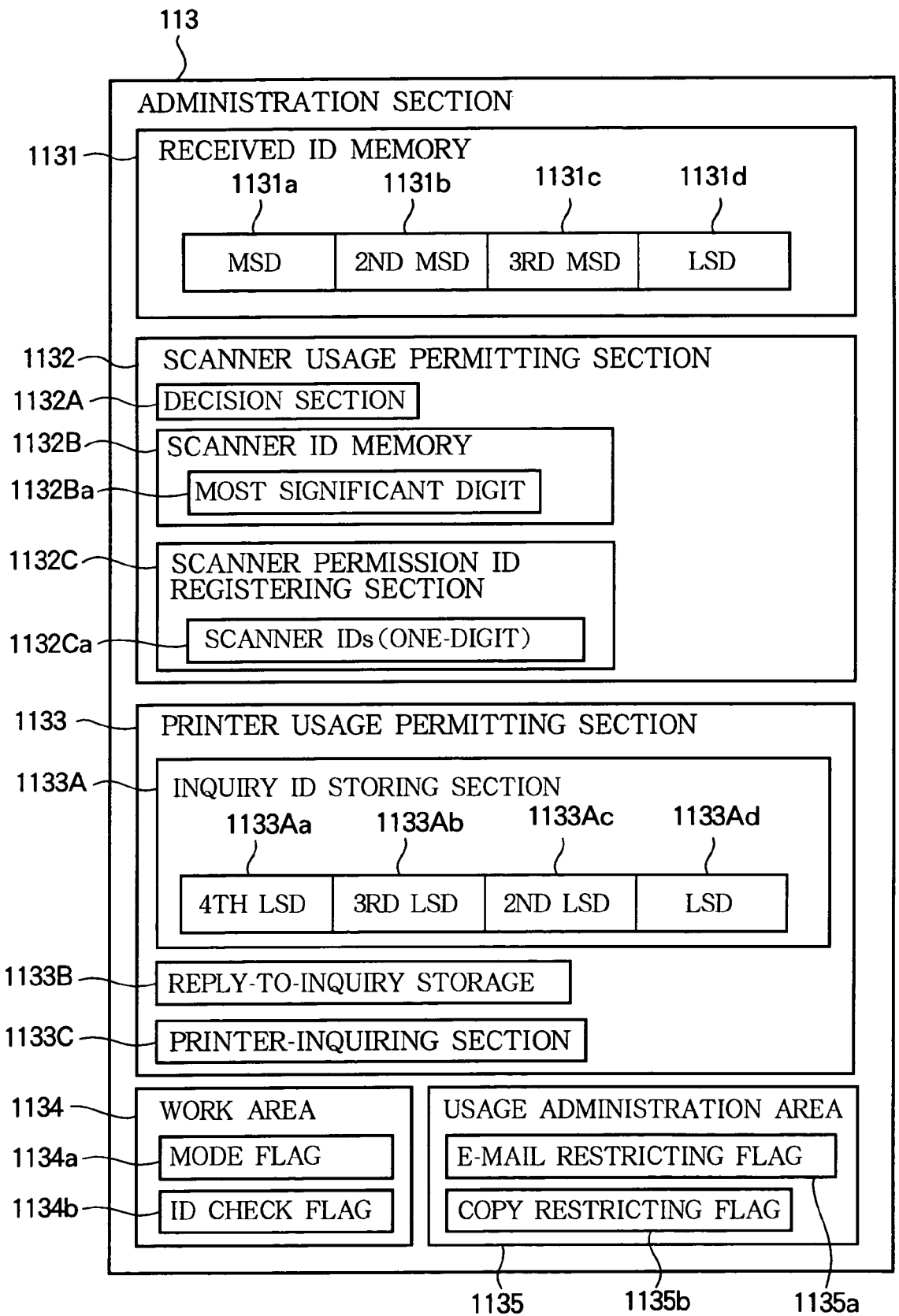
FIG. 16 is a schematic view illustrating the configuration of the administration section.

FIG. 16 is a schematic view illustrating the configuration of the administration section 113. Elements similar to those in FIG. 14 have been given the same reference numerals. The administration section 113 includes a received ID memory 1131, scanner usage permitting section 1132, printer usage permitting section 1133, work area 1134, and usage administration area 1135. The usage administration area 1135 includes an e-mail restricting flag 1135a and a copy restricting flag 1135b. The e-mail restricting flag 1135a indicates whether usage of the e-mail function should be restricted. The copy restricting flag 1135b indicates whether usage of copying function should be restricted. If the usage of the e-mail function should be restricted, the e-mail restricting flag 1135a is set to "ON". If the usage of the e-mail should not be restricted, the e-mail restricting flag 1135a is set to "OFF". Likewise, if the usage of the copying function should be restricted, the copy restricting flag 1135b is set to "ON". If the copying function should not be restricted, the copy restricting flag 1135b is set to "OFF".

{Operation}

The operation of the fourth embodiment will be described. The methods for setting the e-mail restricting flag 1135a and copy restricting flag 1135b will be described. The e-mail restricting flag 1135a and copy restricting flag 1135b are set from an operation panel 14 before the multi-function composite system operates in a specified operation mode. Specifically, the e-mail restricting flag 1135a and copy restricting flag 1135b are set to either "ON" or "OFF" by operating the keys on the operation panel 14. The user operates the keys watching the LCD screen just as when other functions are set.

Figure 17:
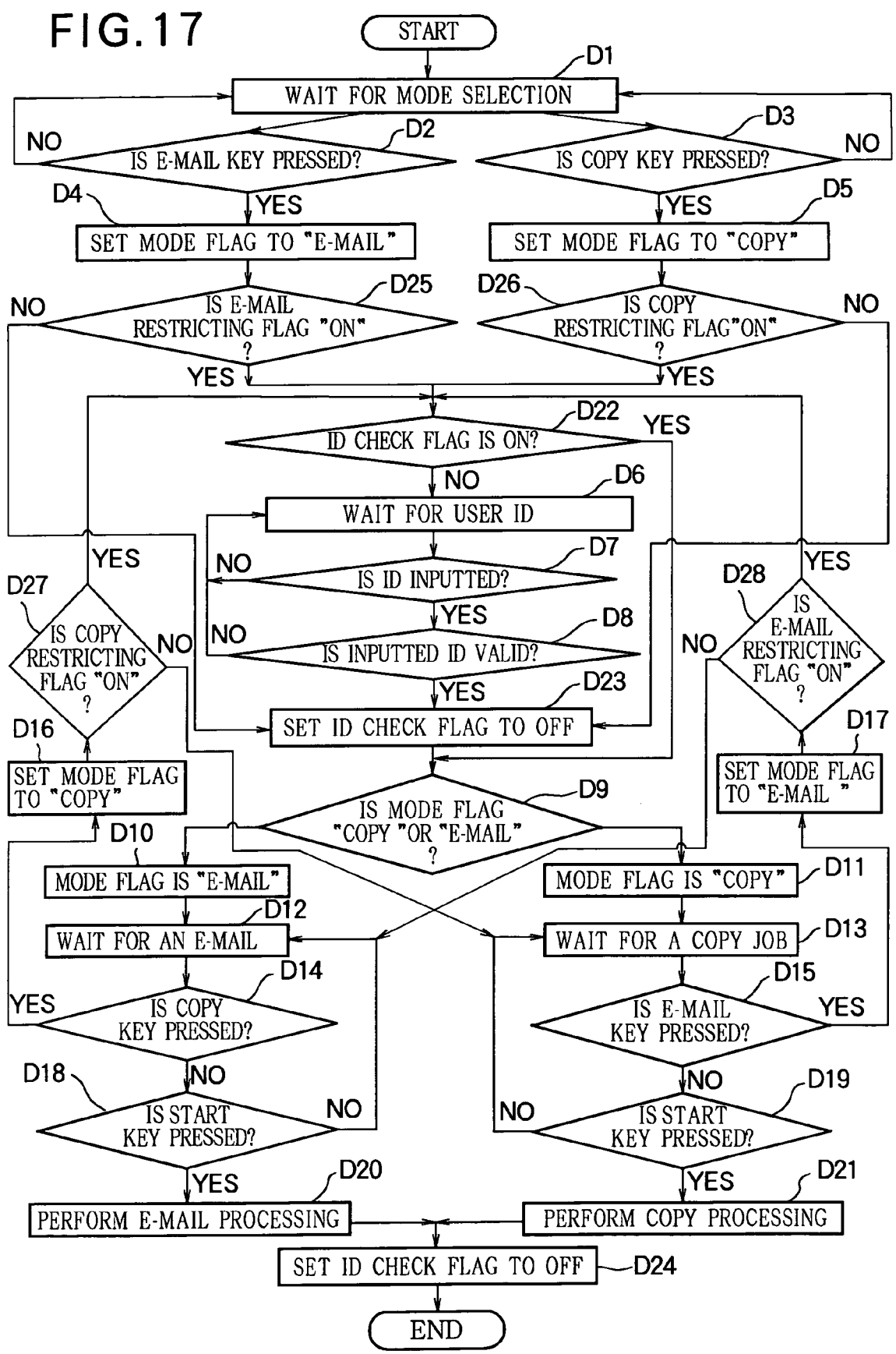
FIG. 17 is a flowchart illustrating a series of operations according to a fourth embodiment.

FIG. 17 is a flowchart illustrating a sequence of operations according to the fourth embodiment. Elements similar to those in FIG. 15 have been given the same reference numerals. Assume that the multi-function composite system is in a mode selection mode at step D1.

When an e-mail mode key 146 is pressed (step D2) and the mode flag 1134a is set to "E-MAIL" (step D4), a check is made to determine whether the e-mail restricting flag 1135a is "ON" (step D25). If the e-mail restricting flag 1135a is "OFF," the operations at step D22 and steps D6-D8 are not carried out but the ID check flag 1134b is set to "ON" (step D22) and the mode flag 1134a is checked (step D9).

When the e-mail restricting flag 1135a is "ON" (step D25) the operations at step D22 (the ID check flag 1134b is "OFF") and steps D6-D8 are carried out. If the answer at step D8 is "OK," then the ID check flag 1134b is set to "ON" (step D23) and the mode flag 1134a is checked (step D9).

If a copy mode key 147 is pressed (step D3) and "COPY" is stored into the mode flag 1134a (step D5), a check is made to determine whether the copy restricting flag 1135b is "ON" (step D26). If the copy restricting flag 1135b is "OFF," the operations at step D22 and steps D6-D8 are not carried out but the ID check flag 1134b is set to "ON" (step D23), and the mode flag 1134a is checked (step D9).

If the copy restricting flag 1135b is "ON" (step D26) the operations at step D22 and steps D6-D8 are carried out. If the answer at step D8 is valid (OK), then the ID check flag 1134b is set to "ON" (step D22), and the mode flag 1134a is checked (step D9).

If the mode flag 1134a holds "E-MAIL" (step D10), the program enters an e-mail standby state (step D12).

When the copy mode key 147 is pressed (step D14) and the content of the mode flag 1134a is changed from "E-MAIL" to "COPY" (step D16), a check is made to determine whether the copy restricting flag 1135b is "ON" (step D27).

If the copy restricting flag 1135b is "ON" (step D27), then the program returns to step D22 where a check is made to determine whether the copy restricting flag 1135b is "ON." Because the copy restricting flag 1135b is "ON" at this moment, the operations at step D6-D8 are not carried out and the program proceeds to step D9 where the content of the mode flag 1134a is checked (step D9).

If the content of the copy restricting flag 1135b is "OFF" (step D27), the program enters a copy standby state at step D13.

If the user does not press the copy key 147 but the start key 143 (step D18), the e-mail processing is carried out (step D20). Upon completion of the e-mail processing, the ID check flag 1134b is set to "OFF" (step D24), thereby completing the operation in FIG. 17.

If the start key 143 is not pressed at step D18, then the program enters an e-mail standby state at step D12.

If the mode flag 1134a holds "COPY" (step D11), then the program enters the copy standby state (step D13).

When the user presses the e-mail mode key 146 (step D15) so that the content of the mode flag 1134a is changed from "COPY" to "E-MAIL" (step D17), a check is made to determine whether the e-mail restricting flag 1135a is "ON" (step D28).

If the e-mail restricting flag 1135a is "ON," the program returns to step D22 where the ID check flag 1134b is checked. Because the ID check flag 1134b is "ON" at this moment, the operation at steps D6-D8 is not carried out but the program jumps to step D9 where the mode flag 1134a is checked.

If the e-mail restricting flag 1135a is "OFF" (step D28) the program enters the e-mail standby state at step D12.

If the user does not press the e-mail mode key 146 at step D15 but the start key 143 (step D19), a copy processing is carried out (step D21). Upon completion of the copy processing, the ID check flag 1134b is set to "OFF" (step D24), thereby completing the sequence of operation in FIG. 17.

If the start key 143 is not pressed at step D19, the program enters the copy standby state at step D13.

As described above, according to the fourth embodiment, the usage administration area 1135 is provided in the administration section 113. The usage administration area 1135 holds a value indicative whether the usage of the scanner 1 and printer 2 should be restricted. It is determined in accordance with the contents of the e-mail restricting flag 1135a and the copy restricting flag 1135b as to whether an ID should be inputted, i.e., a selection is made on an operation mode-by-operation mode basis as to whether an ID should be inputted. Thus, the processing is simplified and the security and usability of the system are improved.

In the fourth embodiment, when the e-mail mode key 146 or copy mode key 147 is pressed, a selection is made in accordance with the contents of the e-mail restricting flag 1135a and the copy restricting flag 1135b as to whether an ID inputting screen should be displayed.

Fifth Embodiment

The configuration of a multi-function composite system according to a fifth embodiment is much the same as that of the first to fourth embodiments. The fifth embodiment differs from the first to fourth embodiments in the configuration of a printer 2.

Figure 18:
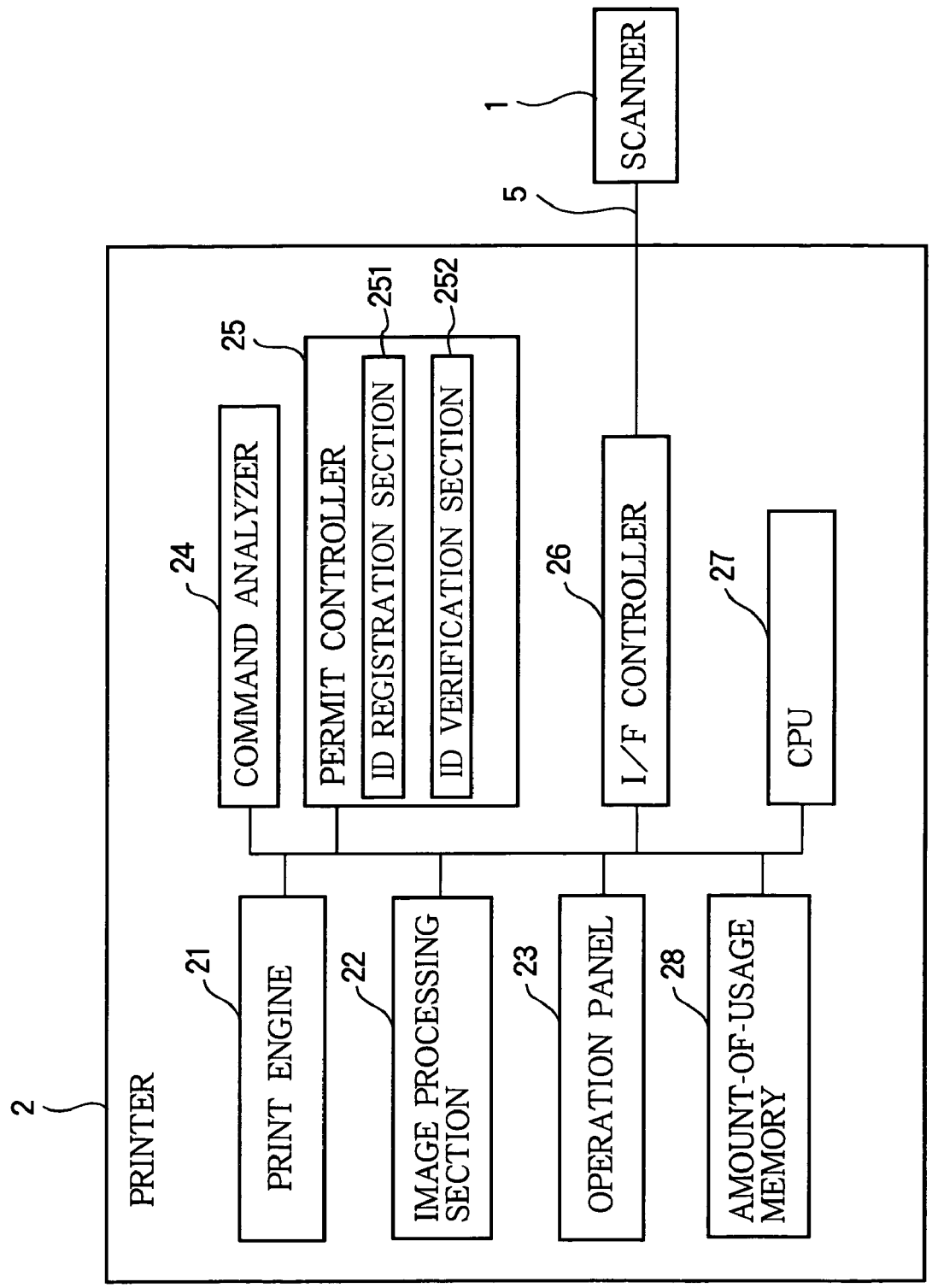
FIG. 18 is a block diagram of a printer.

FIG. 18 is a block diagram of the printer 2. Elements similar to those in FIG. 5 have been given the same reference numerals. Referring to FIG. 18, the printer 2 includes a print engine 21, image processing section 22, operation panel 23, command analyzer 24, permit controller 25, I/F controller 26, CPU 27, and amount-of-usage memory 28. The amount of usage memory 28 holds information on the amount of usage (e.g., the number of pages, the number of print jobs, the amount of time required in printing) for each of the IDs permitted by the permit controller 25 to use the multi-function composite system.

The amount-of-usage memory 28 facilitates the administration of the usage of consumable items such as toner and recording paper on a user-by-user basis.

Sixth Embodiment

Figure 19:
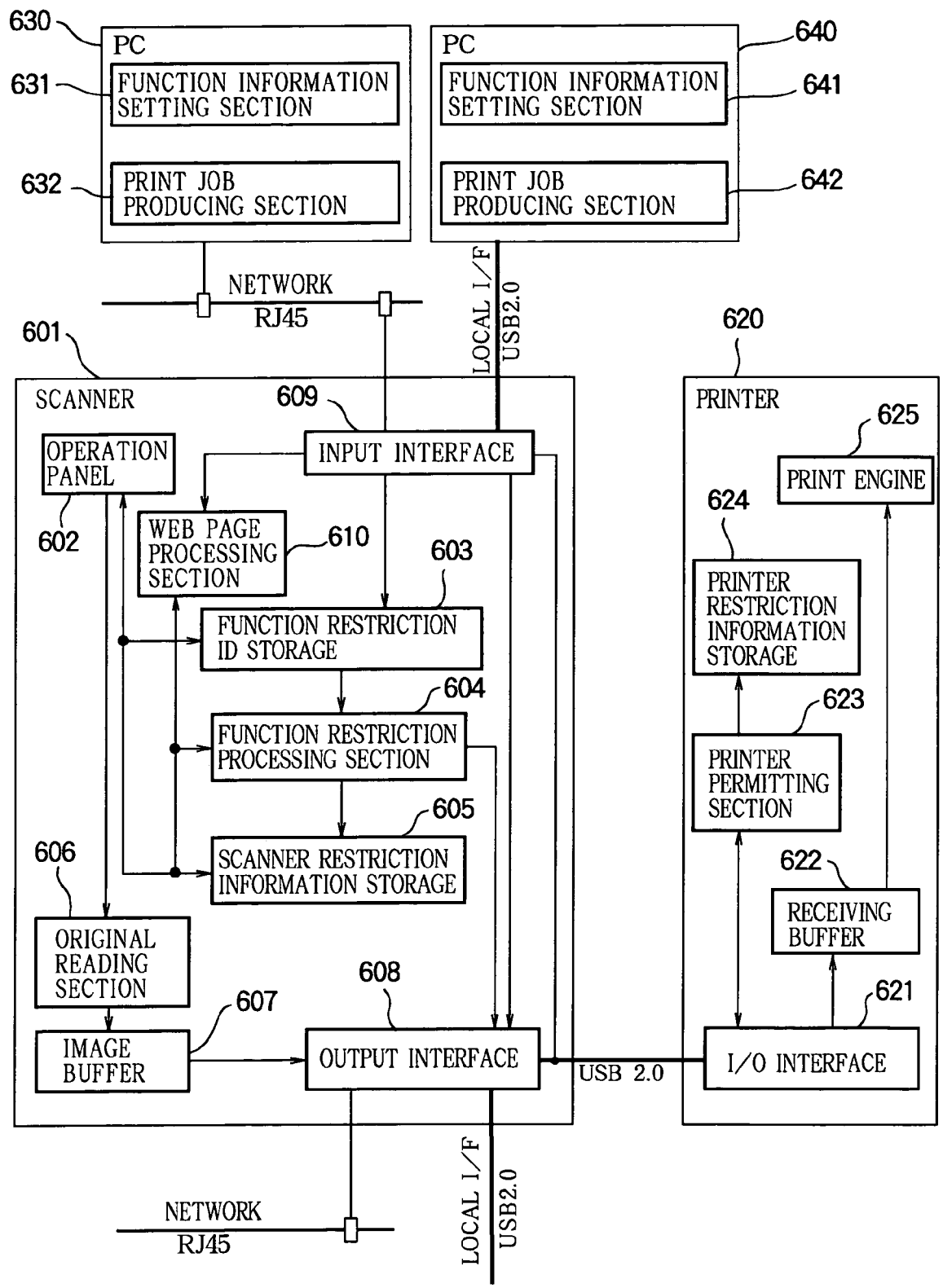
FIG. 19 illustrates the configuration of a multi-function composite system according to a sixth embodiment.

FIG. 19 illustrates the configuration of a multi-function composite system according to a sixth embodiment. Referring to FIG. 19, the multi-function composite system includes a scanner 601, printer 620 connected to the scanner 601 via a local interface such as USB2.0, PC 630 connected to the scanner 601 via a network (e.g., through a RJ45 cable), and PC 640 connected to the scanner 601 via a local interface such as USB2.0.

{Construction}

An operation section 602 is used to command the activation, interruption, and settings of a variety of functions. A function restriction ID storage 603 stores a function restriction ID that is inputted from the operation panel 14. A function restriction processing section 604 makes decisions associated with the scanner, and performs the data processing associated with the printer. A scanner restriction information storage 605 stores the scanner restriction information that is inputted from the operation panel 14.

The scanner 601 includes an original reading section 606, image buffer 607, output interface 608, input interface 609, and a web page processing section 610. The original reading section 606 reads the image of an original. The image buffer 607 stores the image data read from the original. The images of originals and received print jobs are sent to the printer 620, network, and local interface through the output interface 608. Print jobs and various commands are received from the PC 630 and PC 640 connected to the network and local interface through the input interface 609. The web page processing section 610 controls the web page.

The printer 620 includes an I/O interface 621, receiving buffer 622, printer permitting section 623, printer restriction information storage 624, and print engine 625. Through the I/O interface 621, print jobs and commands are received from the scanner 601, and replies to the commands are sent to the scanner 601. The receiving buffer 622 stores received print jobs. The printer restriction information storage 624 stores printer restriction information. The print engine 625 performs the printing of the received print jobs and image processing such as color to black-and-white conversion.

The PC 630 connected to the scanner 601 via the network includes a function information setting section 631 and a print job producing section 632. The function information setting section 631 produces scanner restriction information and printer restriction information and transmits these items of information to the scanner 601. The print job producing section 632 produces print jobs and outputs the print jobs to the scanner 601.

The PC 640 includes a function information setting section 641 and a print job producing section 642. The function information setting section 641 produces scanner restriction information and printer restriction information, and transmits these items of information to the scanner 601. The print job producing section 642 produces print jobs and outputs the print jobs to the scanner 601.

{Operation Section}

FIG. 20 illustrates the operation panel 602 of the scanner 601 according to the sixth embodiment. Referring to FIG. 20, the operation section 602 includes a display 651, ten key 652, cancel button 653, cursor key 654, and select button 655. The display 651 displays items of settings and a variety of messages. The ten key 652 is used to input numerical data. The cancel button 653 is used to cancel a variety of settings. The cursor key 654 is operated to move from menu to menu to select a desired menu. The select button 655 is operated to make a selected setting permanent.

The operation panel 602 further includes a menu button 656, copy button 657, SCAN-TO button 658, color start button 659, monochrome start button 660, and stop button 661. The menu button 656 is used to move from setting menu to setting menu among a variety of setting menus. The copy button 657 is pressed to move to a copy mode. The SCAN-TO button 658 is operated to move to a SCAN-TO mode where images are transmitted over the network. The color start button 659 is used to initiate a color copy mode or SCAN-TO mode. The color start button 660 is used to initiate a monochrome copy mode or SCAN-TO mode. The stop button 661 is operated to interrupt the operation being carried out on the operation section 602.

FIG. 21 illustrates a function restriction ID according to the sixth embodiment. Referring to FIG. 21, the function restriction ID has a 6-digit value. The most significant digit S1 is used as a scanner restriction ID and all of 6 digits (S1 and P1-P5) are used as a printer restriction ID. In the sixth embodiment, a check is made to determine whether the user should be permitted to use the SCAN-TO function. When the SCAN-TO function is used, only a scanner portion of the 6-digit function ID is checked and a printer portion is not checked. Thus, only the scanner restriction ID, i.e., S1, is checked. However, when the copy button is pressed and therefore the printer portion of the 6-digit function ID needs to be checked, the printer restriction ID, i.e., S1 and S2 and P1-P5, is used to inquire the printer 620.

FIG. 22 illustrates an example of the printer restriction information that is stored in the printer restriction information storage 624 in the printer 620. As shown in FIG. 22, there are as many items of printer restriction information as there are registered function restriction IDs. Each of the items of printer restriction information includes a total of 12 bytes, i.e., 6-byte function restriction IDs, 3-byte printing functions, and 3-byte color printing functions.

{Operation}

Figure 23:
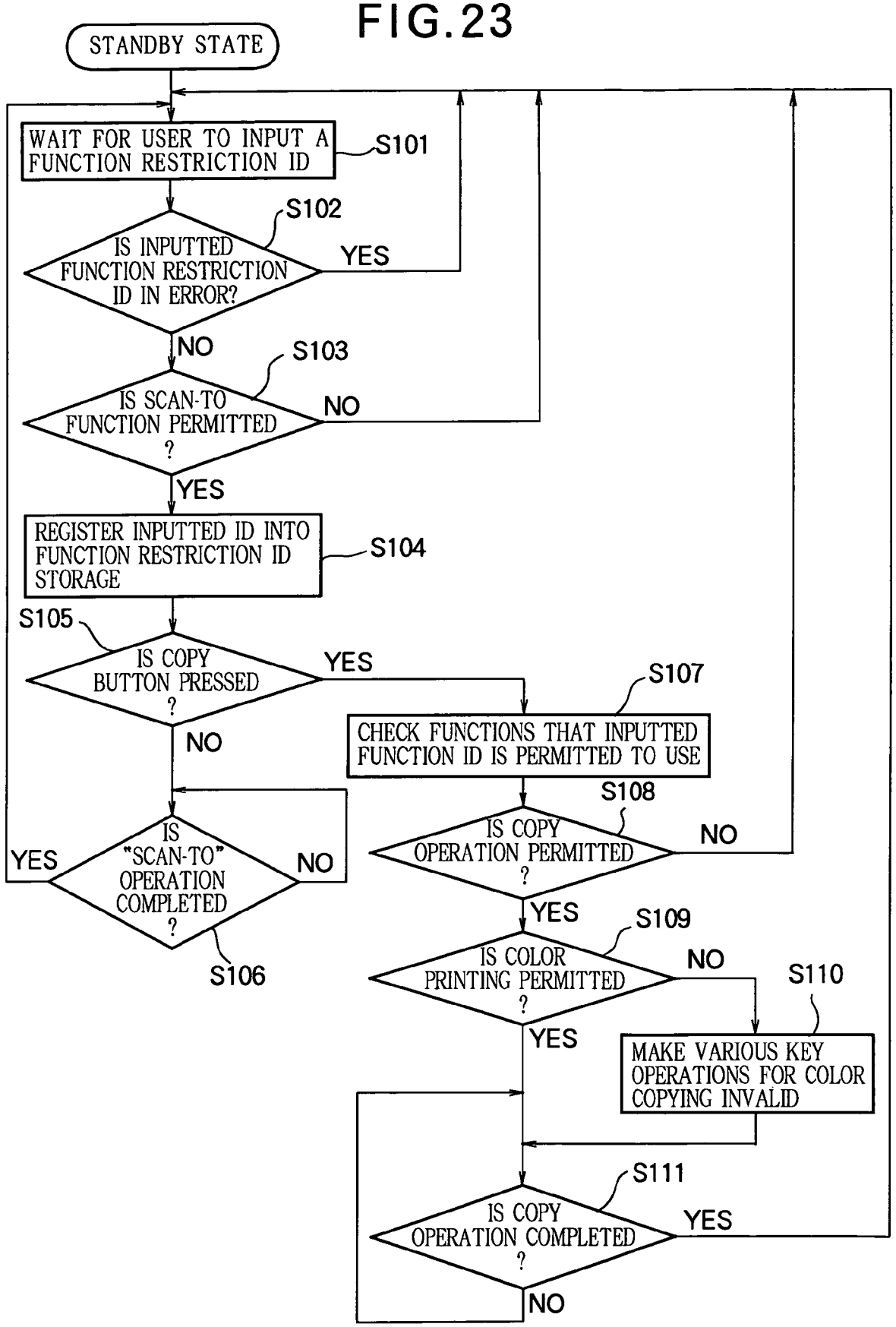
FIG. 23 is a flowchart illustrating the operation of the multi-function composite system according to the sixth embodiment.

The operation of the multi-function composite system according to the sixth embodiment will be described. FIG. 23 is a flowchart illustrating the operation of the multi-function composite system according to the sixth embodiment. FIGS. 24A-24F illustrate messages displayed on the display 651 of the operation panel 602 of the scanner 601.

Initially, the scanner 601 is in a standby state where the program waits for the user to input a function restriction ID (step S101). The display 651 shows a function restriction ID inputting screen, i.e., "Input PIN ID" as shown in FIG. 24A. PIN stands for Personal Identifier Number.

When a function restriction ID is inputted, the function restriction processing section 604 first checks whether an inputted function restriction ID has the necessary number of digits (step S102). Then, the scanner restriction ID S1 is checked to determine whether the user is permitted to use the SCAN-TO function (step S103). If the inputted function restriction ID is not permitted, then the display 651 displays a message "SCAN TO is unusable" in FIG. 24E and then returns to the message screen in FIG. 24A (step S101). Because the SCAN-TO function does not use the printer 620, only the scanner restriction ID is checked.

When an inputted function restriction ID is permitted to use the SCAN-TO function, the function restriction ID is stored into the function restriction ID storage 603 and the program enters a SCAN-TO standby state.

When the program is in the SCAN-TO standby state, if a SCAN-TO button 658 is pressed, the program starts to read an original and continues to transmit the image data read from the original to a PC until the SCAN-TO operation completes (step S106). Then, the program proceeds to step S101 where the display 651 displays the screen "Input PIN ID" in FIG. 24A.

When the program is in the SCAN-TO standby state, if a copy button 657 is pressed (step S105), the function restriction processing section 604 checks the printer 620 whether the input function restriction ID is permitted to use the printing function (step S107).

A check is made to determine whether the copy operation can be performed (step S108). If the printer 620 sends a reply indicative that printing cannot be performed, the display 651 displays the message in FIG. 24D, and the program returns to step S101. If the printer 620 sends a reply indicative that printing is permitted to perform (step S108) and a reply indicative that color printing is not permitted to perform (step S109), then the display 651 displays the message in FIG. 24F. Then, the various key operations for color copying are made invalidated. For example, a press of the color start button 659 of the operation section 602 is invalidated (step S110).

When the monochrome start button 660 is pressed, monochrome copying is performed. Upon completion of the monochrome copying (step S111), the program returns to step At step S109, if the color printing is permitted to perform, color copying is performed upon pressing the color start button 659. Upon completion of color copying (step S111), the program returns to step S101.

{Sequence of Checking Printing Function}

FIG. 25 illustrates the sequence of checking the printing functions that the inputted function restriction ID is permitted to use. The function restriction processing section 604 of the scanner 601 outputs a command requesting to check the printing functions that the function restriction ID is permitted to use. A printer permitting section 623 determines the printing function that the function restriction ID received via the I/O interface 621 is permitted to use. The printer permitting section 623 compares-the received function restriction ID with the printer restriction information registered in the printer restriction information storage 624, thereby identifying the printing function that the received function restriction ID is permitted to use.

{Key Operation}

FIGS. 26A-26G illustrate examples of key operations for setting the scanner function and the printer function. FIGS. 26A-26G assume that only an administrator is permitted to restrict the scanner function and the printer function (restricted by password) by using the operation panel 602 of the scanner 601. The administrator presses the menu button 656 on the operation panel 602 to cause the display 651 to display the screen in FIG. 26A, and then moves the cursor to select the management menu as shown in FIG. 26B. Then, with a pass word inputting screen as shown in FIG. 26C, the administrator inputs an administrator password and then presses the select button 655, thereby causing the display 651 to display a scanner function setting screen as shown in FIG. 26D.

Then, with the scanner function setting screen as shown in FIG. 26D, the administrator selects "Scan to Restriction". With the scanner function setting screen as shown in FIG. 26E, the administrator selects a desired numeral for setting the scanner function restriction and then presses the select button 655. Then, with the printer function setting screen as shown in FIG. 2F, the administrator selects "PIN Setting" and presses the select button 655. Then, with the setting screen for the printer restriction as shown in FIG. 26G, the administrator selects "Enable" of "PIN Setting" and then presses the select button 655.

With the aforementioned key operations, the scanner restriction ID is stored into the scanner restriction information storage 605. The administrator is permitted to set the printer restriction to "VALID" or "INVALID" from the operation section 602 of the scanner 601.

Figure 27:
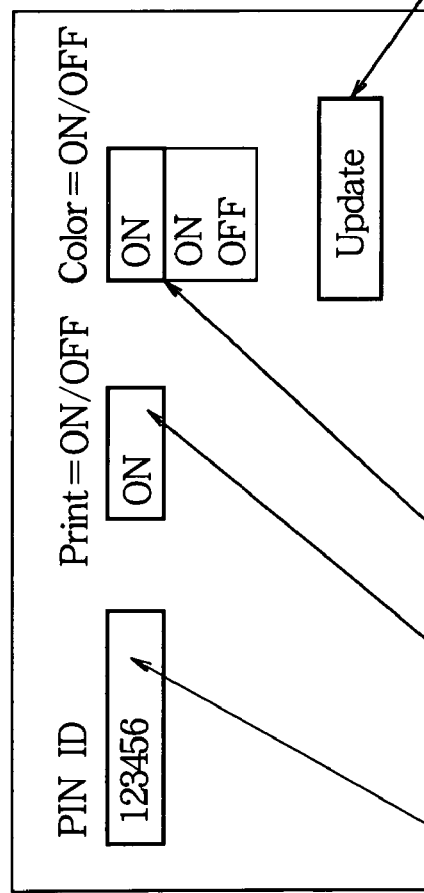
FIG. 27 illustrates a printer function setting screen on a web page displayed on a personal computer.
Figure 28:
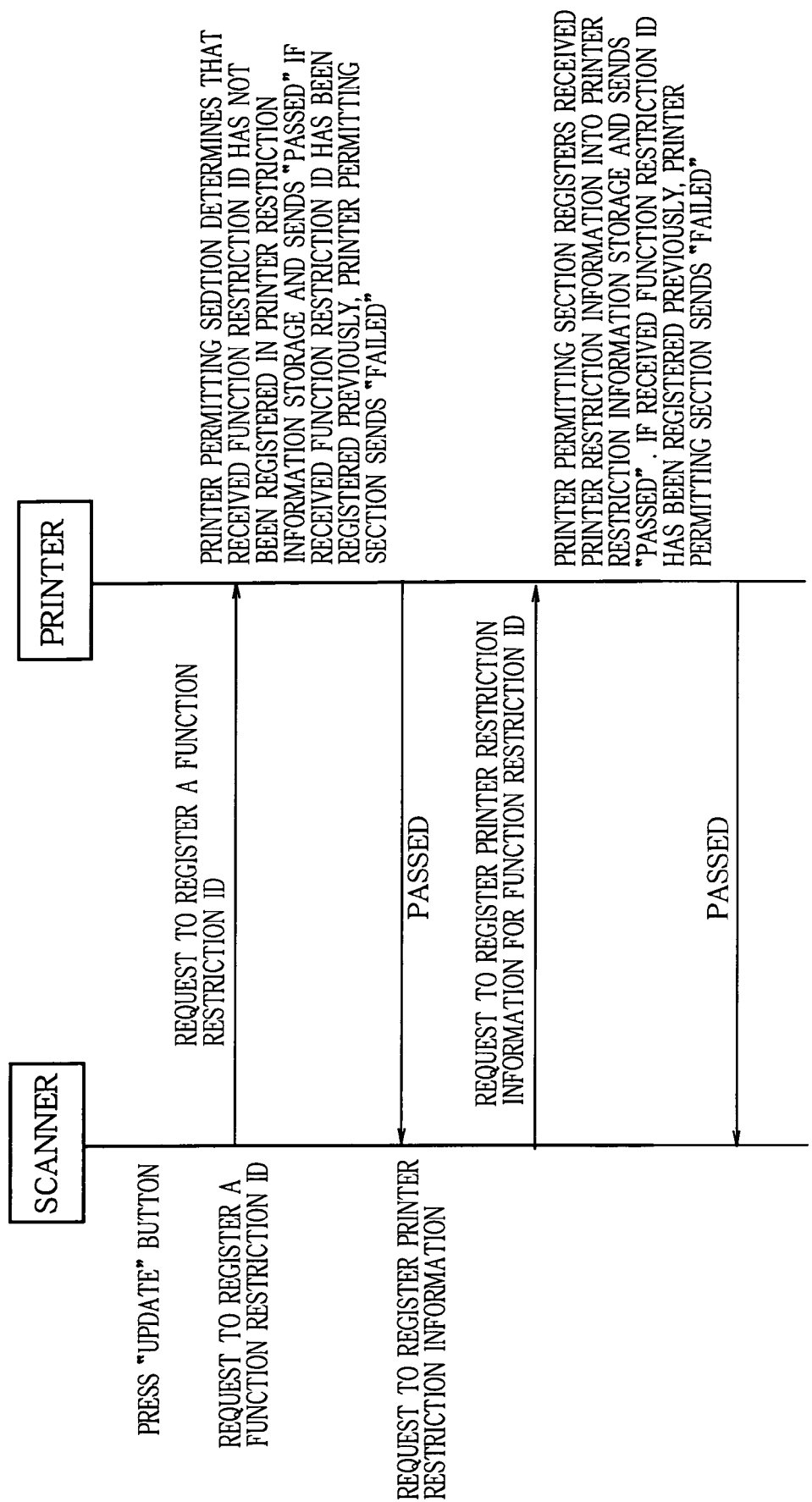
FIG. 28 illustrates the sequence of checking the printing function that the inputted function restriction ID is permitted to use.

FIG. 27 illustrates the printer function setting screen on the web page displayed on the PC 630 or PC 640. FIG. 28 illustrates the sequence of checking the printing function that the inputted function restriction ID is permitted to use. In the sixth embodiment, the printer restriction information can be set (only by an administrator) by using a web page function or a web setting function (PC can access via the Internet and brows web pages using browser software).

Referring to FIG. 27, a PIN ID is inputted and either "ON" or "OFF" of "Print" and either "ON" or "OFF" of "Color" are inputted. Then, an "Update" button is pressed to register a new function restriction ID into the printer restriction information storage 624 of the printer 620.

When the user presses the "Update" button in FIG. 27, the scanner 601 sends a request to register the function restriction ID to the printer 620 as shown in FIG. 28. If the function restriction ID received from the scanner 601 has not been registered previously in the printer restriction information storage 624, the printer permitting section 623 sends to the scanner 601 "PASSED" that indicates that the function restriction ID has been successfully registered. If the function restriction ID received from the scanner 601 has already been registered in the printer restriction information storage 624, the printer permitting section 623 sends to the scanner 601 "FAILED" that indicates that the function restriction ID has been registered previously.

The scanner 601 sends to the printer 620 a request to register the printer restriction information ("ON" or "OFF" information on the printing function and color printing) for the function restriction ID. If the received function restriction ID does not exist in the printer restriction information storage 624, the printer 620 sends "PASSED" to the scanner 601, "PASSED" indicating that the function restriction ID has been successfully registered. If the received function restriction ID exists in the printer restriction information storage 624, the printer 620 sends "FAILED" to the scanner 601, "FAILED" indicating that the function restriction ID has already been registered.

In the sixth embodiment, the printer restriction information is managed in the printer 620 and the scanner restriction information is managed in the scanner 601. This configuration eliminates the need for the scanner 601 to obtain and manage the printer restriction information. In other words, the system does not need to perform such a processing that would otherwise be needed to transmit and receive ID information between a scanner and a printer in the conventional system. This eliminates the program steps for obtaining the printer restriction information.

Additionally, in the event of failure of the printer 620 or scanner 601, it is only necessary to replace or properly set a failed unit. This facilitates maintenance of the system.

Seventh Embodiment

The composite system according to a seventh embodiment has the same configuration as that of the sixth embodiment. Thus, the description of the seventh embodiment will be given with reference to FIG. 19 as well. The seventh embodiment will be described in terms of a portion different from the sixth embodiment.

Figure 29:
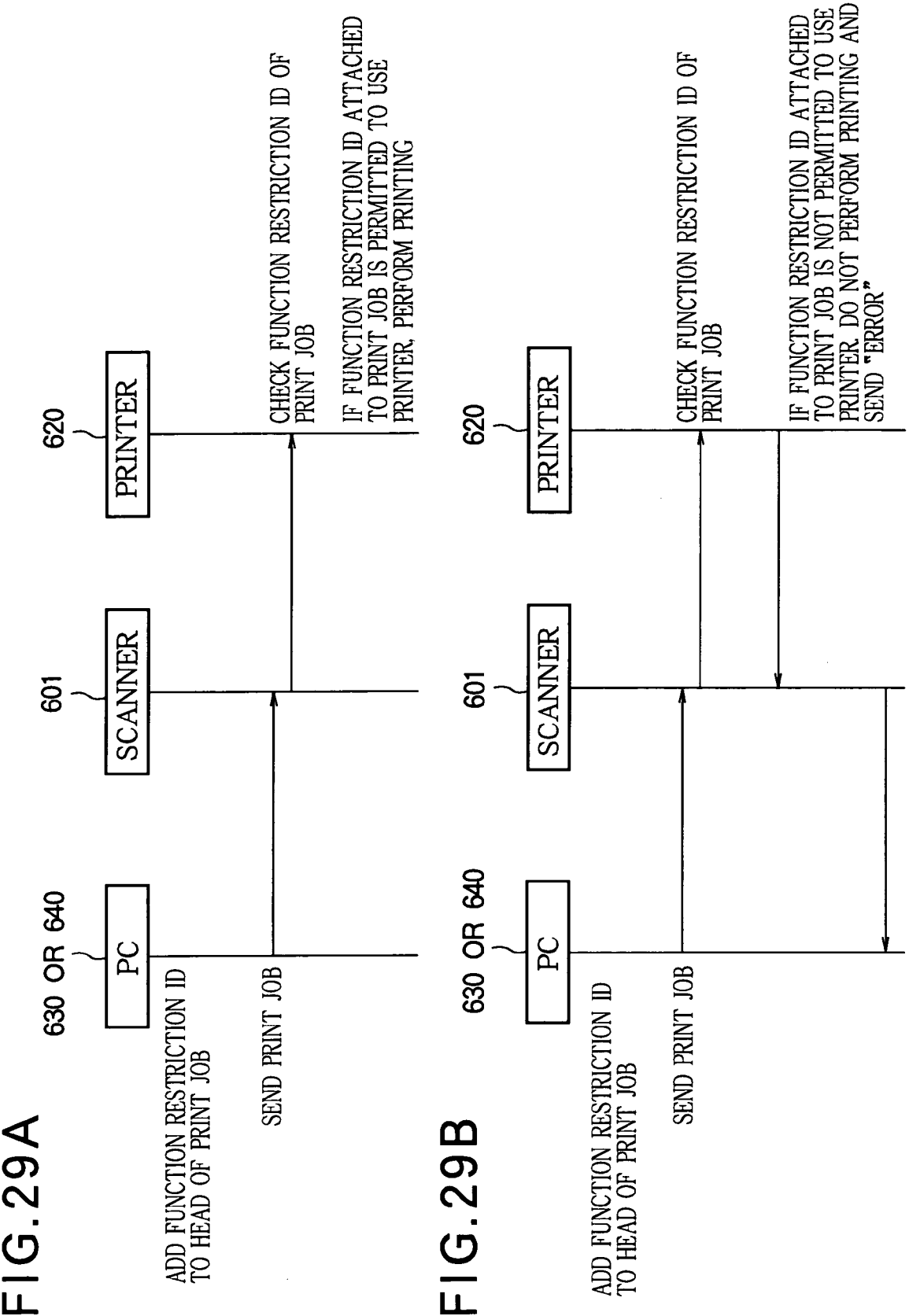
FIGS. 29A and 29B illustrate the sequences of operation according to a seventh embodiment when printing is performed by using an arbitrary application installed in a personal computer.

FIGS. 29A and 29B illustrate the sequences of operation according to the seventh embodiment when printing is performed by using an arbitrary application installed in a PC 300 or a PC 400. When printing is performed from an arbitrary application installed in the PC 300 or the PC 400, a print job producing section 632 in the PC 630 or a print job producing section 642 in the PC 640 attaches the function restriction ID to the head of a print job. A print job is received in the input interface 609 of a scanner 601 and is outputted to a printer 620 via an output interface 608.

A printer permitting section 623 compares the function restriction ID of the print job, received through an input interface 621 of the printer 620, with the function restriction IDs (S1, P1, P2, P3, P4, and P5 in FIG. 21) held in a printer restriction information storage 624 of the printer 620. If the function restriction ID of the print job is permitted to perform color printing, then the print job is stored into a receiving buffer 622, and a print engine 625 performs the color printing of the received print job as shown in FIG. 29A.

If the function restriction ID of the print job received is permitted to perform only black-and-white printing, the print job is stored in the receiving buffer 622. Then, after the print engine 625 performs color to black-and-white conversion, black-and-white printing is performed. The PC 630 or PC 640 may be informed before printing takes place that color to black-and-white conversion is performed.

As shown in FIG. 29B, when the function restriction ID of the received print job is found to be unacceptable or is not coincident with any of the function restriction IDs held in the printer restriction information storage 624, printing is not performed and an error response is sent through the I/O interface 621 to the scanner 601. The scanner 601 sends the error response received via the output interface 608 to the PC 630 or the PC 640 that requested to print.

As described above, in the seventh embodiment, in both the copying mode and the printing mode from either PC 630 or PC 640, a common printer restriction can be applied so that the scanner 601 need not perform any processing for function restriction. Thus, the seventh embodiment eliminates the need for a processing associated with the checking of ID that would otherwise affect the printing performance.

Eighth Embodiment

The composite system according to an eighth embodiment has the same configuration as that of the sixth embodiment. Thus, the description of the eighth embodiment will be given with reference to FIG. 19 as well. The eighth embodiment will be described in terms of a portion different from the sixth embodiment.

Figures 30, 31:
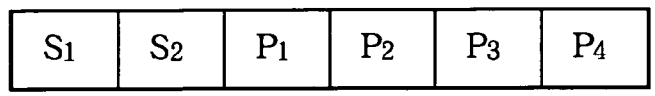
FIG. 30 illustrates a function restriction ID according to an eighth embodiment.
FIG. 31 illustrates scanner restriction information stored in a scanner restriction information storage.

FIG. 30 illustrates a function restriction ID according to the eighth embodiment. Referring to FIG. 30, the function restriction ID has a 6-digit value. The most significant digit Si and second most significant digit S2 are used as a scanner restriction ID and all of 6 digits (S1 and S2 and P1-P4) are used as a printer restriction ID. In the eighth embodiment, a check is made to determine whether the inputted ID is permitted to use the SCAN-TO function. When the SCAN-TO function is used, only a scanner portion of the function restriction ID is checked and a printer portion is not checked. Thus, only the scanner restriction ID, i.e., S1 and S2, is checked. However, when the copy button is pressed and therefore the printer portion needs to be checked, the printer restriction ID, i.e., S1 and S2 and P1-P4, is used to inquire the printer 620.

FIG. 31 illustrates the scanner restriction information stored in the scanner restriction information storage 605. Referring to FIG. 31, the scanner restriction information is two-byte information: one-byte reading function permit information (S1) and one-byte color reading function information (S2). In the eighth embodiment, when S1=1 and S2=5, the color reading of an original can be performed. When S1=1 and S2=6, the color reading of an original cannot be performed. When S1=3 and S2=7, the reading of an original cannot be performed.

Figure 32:
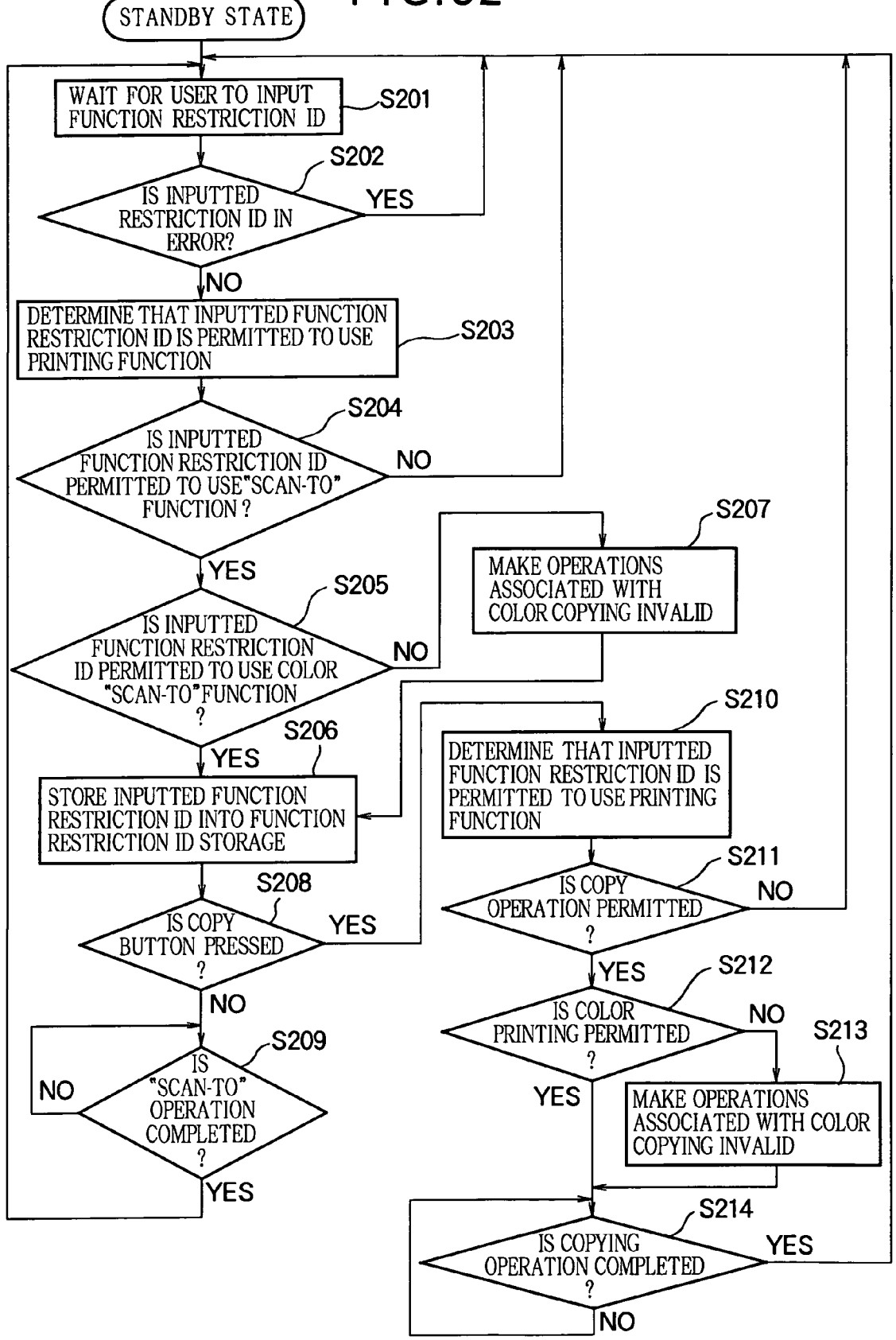
FIG. 32 is a flowchart illustrating the operation of a composite system according to the eighth embodiment.

The operation of the eighth embodiment will be described. FIG. 32 is a flowchart illustrating the operation of a composite system according to the eighth embodiment. Reference is made to FIGS. 24A-24F for messages displayed on a display 651 of an operation panel 602.

Initially, a scanner 601 is in a standby state where the program waits for the user to input a function restriction ID (step S201). The display 651 of the scanner 601 shows a function restriction input ID screen "Input PIN ID" in FIG. 24A.

When a function restriction ID is inputted, a function restriction processing section 604 of the scanner 601 first checks whether an inputted function restriction ID has a necessary number of digits (step S202). Then, scanner 601 checks the printer 620 to determine whether the inputted function restriction ID is permitted to use the printing function (step S203), i.e., to determine whether the inputted function restriction ID is permitted to use the SCAN-TO function (step S204). If the inputted function restriction ID is not permitted to use the SCAN-TO function, then the display 651 displays "Scan To is Unusable" in FIG. 24E, indicating that usage of the SCAN-TO function is not permitted. Then, the program returns to step S201 where the display 651 displays "Input PIN ID" indicating that the system waits for a function restriction ID.

If the inputted function restriction ID is permitted to use the SCAN-TO function (step S204), then a check is made to determine whether the inputted function restriction ID is permitted to use the color SCAN-TO function (step S205). If the inputted function restriction ID is not permitted to use the color SCAN-TO function ("N" at step S205), then the operations associated with the color SCAN-TO function are made invalid (e.g., a press of the color start button 659 on the operation section 602 is made invalid), thereby preventing a color SCAN-TO job from being performed (step S207). Then, the inputted function restriction ID is stored into a function restriction ID storage 603 and the program enters a standby state waiting for a SCAN-TO job (step S206).

When the program is in the standby state waiting for a SCAN-TO job, if a SCAN-TO button 658 is pressed, a reading section 606 starts reading an original and the image data thus read is sent to a PC (step S208) and then a SCAN-TO operation completes (step S209). Then, the program returns to step S201 where the display 651 displays "Input PIN ID" indicating that the system waits for a function restriction ID.

When the program is in the SCAN-TO standby state waiting for a SCAN-TO job, if the COPY button 657 is pressed (step S208), the function restriction processing section 604 checks the printer 620 to determine whether the inputted function restriction ID is permitted to use the printing function (step S210).

When the scanner 601 receives from the printer 620 a reply that the printer 620 can print (step S211), the program jumps back to step S201 where the display 651 displays "Input PIN ID" indicating that the system waits for a function restriction ID. When the scanner 601 receives from the printer 620 a reply that the printer can print (step S211) or a reply that printer cannot perform color printing (step S212), the operations associated with color copying are made invalid (step S213). For example, a press of the color start button 659 on the operation section 602 is made invalid, thereby preventing the color copying from being performed. Then, the program proceeds to step S214 where the program waits for a copy job. When the scanner 601 receives from the printer 620 a reply that the color printing can be performed (step S212), the program proceeds to step S214 where the program waits for a color copying job. When either the black-and-white start button 660 or color start button 659 is pressed depending on the function restriction, either monochrome copying or color copying is performed. Upon completion of copying (step S214), the program returns to step S201 where the display 651 displays "Input PIN ID" (FIG. 24A) indicating that the system waits for a function restriction ID.

FIGS. 33A-33G illustrate examples of key operations for selecting the scanner functions when the operation section 602 of the scanner 601 is operated. FIGS. 33A-33G assume that only an administrator is permitted to set the scanner restriction (restricted by password) using the operation panel 602 of the scanner 601. The administrator presses the menu button 656 on the operation section 602 to cause the display 651 to display the screen in FIG. 33A, and then moves the cursor to select the management menu as shown in FIG. 33B. Then, with a pass word inputting screen as shown in FIG. 33C, the administrator inputs an administrator password and then presses a select button 655, thereby causing the display 651 to display a scanner function setting screen as shown in FIG. 33D.

Then, with the scanner function setting screen as shown in FIG. 33D, the administrator selects "Scan to Restriction." Then, with the scanner function setting screen as shown in FIG. 33E, the administrator selects a desired numeral for setting scanner function restriction and then presses the select button 655. Then, with a color scan function setting screen as shown in FIG. 33F, the administrator selects "Color Scan Restriction" and then presses the select button 655. With a printer function setting screen as shown in FIG. 33G, the administrator selects "Color Scan Restriction" (Selecting "5" permits color reading) and then presses the select button 655.

With the aforementioned operations, the scanner restriction ID that is set at the Scan to Restriction is stored into the scanner restriction information storage 605. The printer restriction can be set to "VALID" or "INVALID" from the operation section 602 of the scanner 601.

As described above, the eighth embodiment allows implementing of the same function restriction as the copying function in terms of the SCAN-TO function.

In the sixth to eighth embodiments, respective digits are assigned to numerical values and corresponding function restrictions. This facilitates administration and setting of IDs.

In the sixth to eighth embodiments, different digits of the scanner restriction information are used to represent VALID/INVALID of the scan/color scan of the scanner. Likewise, different digits of printer restriction ID may be assigned to represent monochrome printing/color printing and the value for each digit may be registered to indicate VALID/INVALID of the function.

The scanner and printer have been described as being connected via USB2.0 in the aforementioned embodiments, the interface for this purpose may be implemented with other general purpose bi-directional interface such as IEEE1284 interface, IEEE1394 interface, or SCSI, or other exclusive interface.

In the sixth to eighth embodiments, while the function restriction ID has a 6-digit numerical value, the function restriction ID may also be an alphanumeric expression.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A composite system including an image-inputting apparatus into which an image is inputted, and an image-outputting apparatus that receives the image from the image-inputting apparatus and outputs the received image, wherein the image-inputting apparatus includes:
   an information receiving section that receives a first item of information;
   a first decision section that makes a first determination as to whether the first item of information should be permitted to use the image-inputting apparatus, the first determination being made based on the first item of information inputted into said image-inputting apparatus and a second item of information (IDs) that has been registered previously in the image-inputting apparatus; and
   a first transmitter that transmits the first item of information to the image-outputting apparatus;
   wherein the image-outputting apparatus includes:
   a second decision section that makes a second determination as to whether the first item of information should be permitted to use the image-outputting apparatus, the second determination being made based on the first item of information and a third item of information that has been registered previously in the image-outputting apparatus; and
   a second transmitter that transmits a reply indicative of the second determination to the image-inputting apparatus;
   wherein the image-inputting apparatus outputs the image to the image-outputting apparatus (2) in accordance with the first determination made by said first decision section and the reply.

2. The composite system according to claim 1, wherein said first decision section makes the first determination by checking a part of the first item of information against a corresponding part of the second item of information.

3. The composite system according to claim 1, wherein said image-inputting apparatus further includes an operation mode storing section that holds a selected operation mode;
   wherein said first decision section makes the first determination and said second decision section makes the second determination after the operation mode storing section holds the selected operation mode;
   wherein the image-inputting apparatus outputs the image to the image-outputting apparatus in accordance with the first determination, the reply, and the selected operation.

4. The composite system according to claim 1, wherein the image-inputting apparatus further includes a determination storing section that holds information on whether said first decision section has made the first determination and said second decision section has made the second determination,
   wherein only when the information held in the determination storing section indicates that said first decision section has not made the first determination and said second decision section has not made the second determination, said image-inputting apparatus prompts inputting of the first item of information for said first and second decision sections to make the first and second determinations, respectively;
   wherein the determination storing section holds information indicative that said first decision section has made the first determination and said second decision section has made the second determination, in response to the first determination and the reply;
   wherein the determination storing section is cleared prior to selection of another operation mode.

5. The composite system according to claim 1, wherein said image-inputting apparatus further includes a usage restriction section that holds information that describes whether usage of the image-inputting apparatus and the image-outputting apparatus should be restricted;
   wherein only when the information held in the usage restriction section indicates that usage of the image-inputting apparatus should be restricted, said image-inputting apparatus prompts inputting of the first item of information for said first and second decision sections to make the first determination and second determination, and the image-inputting apparatus outputs the image to the image-outputting apparatus in accordance with the first determination and the second determination.

6. The composite system according to claim 1, wherein the image-outputting apparatus includes an amount-of-usage storing section that holds a fourth item of information on an amount of usage of the image-outputting apparatus in which the first item of information is permitted to use the image-outputting apparatus.

7. The composite system according to claim 1, wherein the second item of information corresponds to functions of the image-inputting apparatus and indicates that the first item of information is permitted to use the image-inputting apparatus;
   wherein the third item of information corresponds to functions of the image-outputting apparatus and indicates that the first item of information is permitted to use the image-outputting apparatus.

8. The composite system according to claim 7, wherein the image-inputting apparatus includes an operation section that is operated to activate a function of the image-inputting apparatus;

wherein the operation section is also operated to change a value of the first item of information in accordance with the first determination made by said first decision section.

9. The composite system according to claim 7, wherein the image inputting apparatus includes an interface through which the image-inputting apparatus communicates with an external apparatus; and a function restriction ID storing section into which the first item of information and the second item of information are inputted through the interface.

10. The composite system according to claim 1, wherein a first part of the second item of information and a first part of the third item of information correspond to a permission of usage of a first function of the image-inputting apparatus;

wherein a second part of the second item of information and a second part of the third item of information correspond to a permission of usage of a second function of the image-outputting apparatus.

11. The composite system according to claim 8, wherein the image-inputting apparatus includes an operation section that is operated to activate a function of the image-inputting apparatus;

wherein the operation section is also operated to change a value of the first item of information in accordance with the determination made by said first decision section.

12. The composite system according to claim 8, wherein the image inputting apparatus includes an interface through which the image-inputting apparatus communicates with an external apparatus; and a function restriction ID storing section into which the first item of information and the second item of information are inputted through the interface.

13. The composite system according to claim 1, wherein the image-inputting apparatus includes an interface through which the image-inputting apparatus communicates with an external apparatus;

wherein when the first item of information and image data are inputted into the image-inputting apparatus through the interface, the image-outputting apparatus receives the first item of information through the image-inputting apparatus and said second decision section makes the second determination as to whether the image data should be outputted.

14. The composite system according to claim 1, wherein the third item of information describes whether the first item of information is permitted to use a predetermined function of the image-outputting apparatus;

wherein said second decision section makes the second determination based on the third item of information as to whether the image data should be outputted using a predetermined function or without using the predetermined function.

* * * * *